(12) United States Patent
Masumiya et al.

(10) Patent No.: US 10,007,251 B2
(45) Date of Patent: Jun. 26, 2018

(54) MACHINE TOOL CONTROL DEVICE AND MACHINE TOOL

(71) Applicant: MAKINO MILLING MACHINE CO., LTD., Tokyo (JP)

(72) Inventors: Yasunori Masumiya, Aiko-gun (JP); Keitaro Suzuki, Aiko-gun (JP); Kyohei Suzuki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 537 days.

(21) Appl. No.: 14/439,119

(22) PCT Filed: Oct. 30, 2012

(86) PCT No.: PCT/JP2012/078050
§ 371 (c)(1),
(2) Date: Apr. 28, 2015

(87) PCT Pub. No.: WO2014/068675
PCT Pub. Date: May 8, 2014

(65) Prior Publication Data
US 2015/0293522 A1    Oct. 15, 2015

(51) Int. Cl.
*G06F 19/00* (2018.01)
*G05B 19/402* (2006.01)
*G05B 19/416* (2006.01)

(52) U.S. Cl.
CPC ....... *G05B 19/402* (2013.01); *G05B 19/4163* (2013.01)

(58) Field of Classification Search
CPC .......................... G05B 19/402; G05B 19/4163
USPC ....................................................... 700/186
See application file for complete search history.

(56) References Cited

U.S. PATENT DOCUMENTS

| 5,545,959 | A  | 8/1996  | Otsuki et al. |
| 2012/0271446 | A1 | 10/2012 | Sato et al. |
| 2013/0253695 | A1 | 9/2013  | Iuchi et al. |

FOREIGN PATENT DOCUMENTS

| EP | 2208572    | 7/2010  |
| EP | 2868412    | 5/2015  |
| JP | 6-332524   | 12/1994 |
| JP | 2010-97399 | 4/2010  |
| JP | 2012-161861| 8/2012  |

(Continued)

OTHER PUBLICATIONS

Fussell B. K., et al. (Apr. 1, 2003). "Modeling of cutting geometry and forces for 5-axis sculptured surface machining", Computer Aided Design, 35(4): 333-346.

(Continued)

*Primary Examiner* — Ziaul Karim
(74) *Attorney, Agent, or Firm* — Morrison & Foerster LLP

(57) ABSTRACT

A machine tool control device includes a calculation unit for estimating, on the basis of the tool path for machining using a tool and information on the workpiece, the portion of the tool that forms the final machined surface. The control device also includes a feed rate-setting unit for estimating the fastest moving point, among multiple moving points contained in the portion that forms the final machined surface, for which the relative velocity of the tool with respect to the workpiece is maximum and setting the feed rates for the machine tool movement shafts so that the relative velocity of the fastest moving point is at or below a previously specified relative velocity.

4 Claims, 20 Drawing Sheets

(56) References Cited

FOREIGN PATENT DOCUMENTS

| | | |
|---|---|---|
| JP | 5013024 | 8/2012 |
| WO | WO-2012/101789 | 8/2012 |

OTHER PUBLICATIONS

International Search Report dated Feb. 5, 2013, directed towards International Application No. PCT/JP2012/078050, 1 page.

MACHINE TOOL CONTROL DEVICE AND MACHINE TOOL

CROSS-REFERENCE TO RELATED APPLICATIONS

This application is a U.S. National Phase patent application of International Patent Application No. PCT/JP2012/078050, filed on Oct. 30, 2012, which is hereby incorporated by reference in the present disclosure in its entirety.

FIELD OF THE INVENTION

The present invention relates to a control device of a machine tool and the machine tool.

BACKGROUND OF THE INVENTION

A machine tool which performs machining, such as cutting, by moving a tool relative to a workpiece is known in a conventional technique. In such a machine tool, a numerical control-type machine tool is known which specifies a path of a tool by coordinates of a predetermined axis or the like and performs machining by automatically moving the tool with respect to a workpiece. The numerical control type machine tool can perform machining using a desired tool path at a desired feed rate by describing coordinates and a movement speed in a machining program.

Patent literature 1 discloses a speed control method for moving a tip end of a tool at a given command movement speed when machining is performed by changing an angle of the tool. This patent literature discloses that a distribution moving amount of each predetermined period is calculated on condition that linear interpolation is performed using only a linear moving axis without regard to an angle change of a tool, and a position deviation caused by a rotational movement later occurring on a tip end of the tool is added to the distribution moving amount.

CITATIONS LIST

Patent literature 1: Japanese Laid-open Patent Publication No. 6-332524

SUMMARY OF THE INVENTION

A feed rate which is a relative movement speed of a tool to a workpiece is known to have an influence on machining accuracy of a machining surface. When the feed rate is lowered, a high precision machining surface can be generated. On the other hand, when the feed rate is lowered including a sufficient margin, a machining time is elongated. Thus, it is preferable to accurately control the feed rate to be a desired speed.

In a conventional technique, it is known that a feed rate regarding a moving axis of a machine tool is input to a machining program. However, the feed rate regarding the moving axis of the machine tool sometimes does not match a speed of a machining part of a tool with respect to a machining surface of a workpiece. For example, when a cylindrical cam is manufactured, a groove portion is formed on a surface of a columnar workpiece. Since the groove portion is formed on a circumferential surface of the workpiece, the tool rotationally moves with respect to the workpiece. When the workpiece is machined in a curved shape associated with a movement of a rotational feed axis as described above, a speed in a part of an area in which the tool machines the workpiece may sometimes differ from the feed rate of the moving axis of the machine tool. Thus, the machining accuracy of the machining surface of the workpiece may sometimes be lowered than a desired accuracy.

A control device of a machine tool of the present invention is a control device of a machine tool which machines a workpiece while a tool is made move relative to the workpiece and includes an arithmetic unit configured to estimate a portion of the tool which finally generates a machining surface when the tool machines the workpiece based on a tool path for the tool to perform machining and information of the workpiece. The control device includes a feed rate setting unit configured to estimate a fastest moving point at which a relative speed of the tool to the workpiece is a maximum among a plurality of moving points included in the portion which finally generates the machining surface and set a feed rate regarding a moving axis of the machine tool so that a relative speed of the fastest moving point is a preliminarily specified relative speed or less.

According to the above-described invention, a plurality of relative positions of the tool to the workpiece can be specified in input numerical data to be input to the arithmetic unit, the plurality of relative positions includes a first relative position and a second relative position immediately after the first relative position, and the feed rate setting unit can estimate the fastest moving point in a movement from the first relative position to the second relative position and set the feed rate regarding the moving axis in the movement from the first relative position to the second relative position.

According to the above-described invention, the feed rate setting unit can set the feed rate regarding the moving axis based on a length of time in which it takes the tool to move from the first relative position to the second relative position with respect to the workpiece.

According to the above-described invention, the arithmetic unit can generate a third relative position between the first relative position and the second relative position, and the feed rate setting unit can estimate the fastest moving point in a movement between two successive relative positions and set the feed rate regarding the moving axis in the movement between the two successive relative positions.

The machine tool of the present invention includes the above-described control device of the machine tool and a moving device which make the tool move relative to the workpiece based on the feed rate set by the feed rate setting unit.

According to the present invention, a control device of a machine tool and the machine tool which suppress deterioration of machining accuracy on a machining surface can be provided.

DETAILED DESCRIPTION OF THE INVENTION

A control device of a machine tool and the machine tool according to an embodiment are described with reference to FIG. 1 to FIG. 28. As the machine tool, a horizontal machining center in which a spindle extends in a horizontal direction is described as an example. Grooving which forms a groove portion on a workpiece is described as an example. According to the present embodiment, a substitute tool smaller than a specified tool is used for grooving in place of the specified tool specified by a user.

Figure 1:
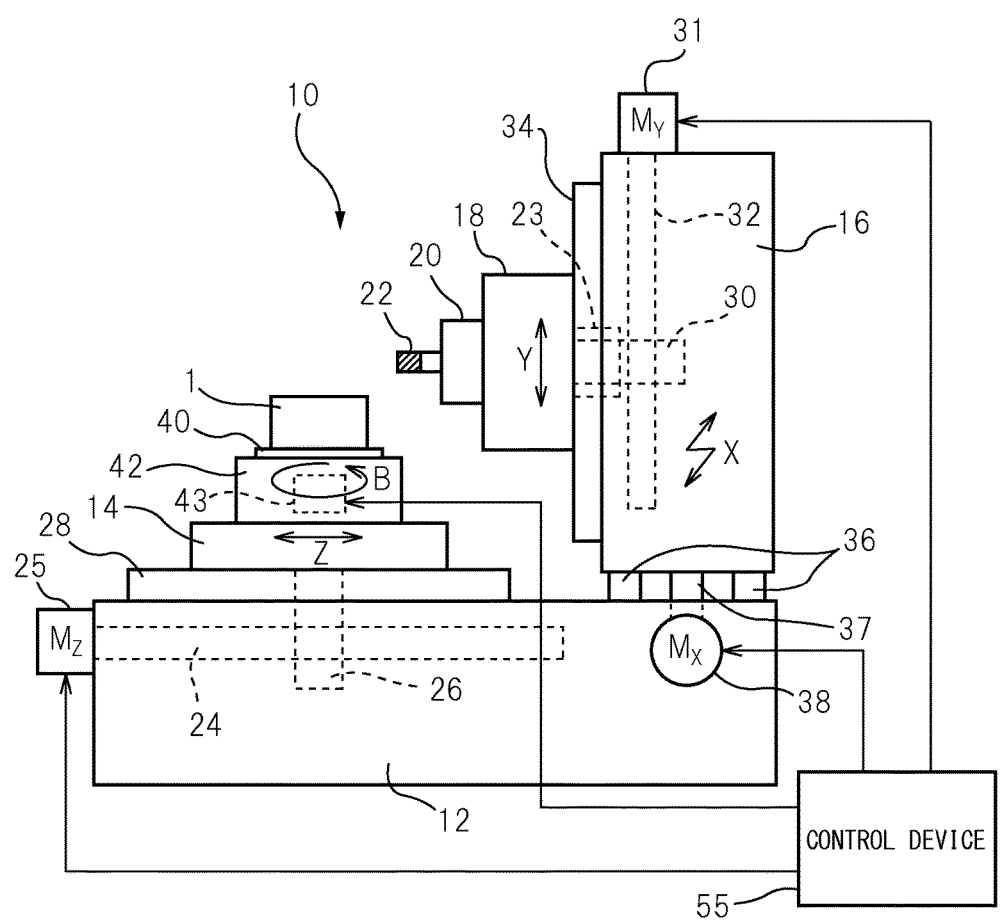
FIG. 1 is a schematic view of a numerical control type machine tool.

FIG. 1 is a schematic view of a numerical control type machine tool. A substitute tool 22 is mounted on a machine tool 10 illustrated in FIG. 1 as a rotary tool performing machining. The machine tool 10 includes a moving device which relatively moves the substitute tool 22 and a workpiece 1. The moving device includes a plurality of moving axes. The plurality of moving axes includes an X axis, a Y axis, and a Z axis, which are linear feed axes, and a B axis, which is a rotational feed axis. The machine tool 10 includes a bed 12 disposed on a floor of a factory or the like. A Z-axis guide rail 28 is fixed to an upper surface of the bed 12. The Z-axis guide rail 28 is disposed to extend in a Z-axis direction (a right and left direction in FIG. 1).

A table 14 is disposed on an upper surface of the Z-axis guide rail 28. The table 14 is slidably disposed to the Z-axis guide rail 28. The table 14 moves along the Z axis. A numerical control type rotary table 42 for rotating the workpiece 1 around the B axis is disposed on an upper surface of the table 14. The workpiece 1 is fixed to an upper surface of the rotary table 42 via a workpiece holding member 40.

An X-axis guide rail 36 is fixed to an upper surface of the bed 12. The X axis is perpendicular to the Z axis and extends in the horizontal direction (a vertical direction of a paper surface of FIG. 1). The X-axis guide rail 36 is formed to extend along the X axis. A column 16 is slidably disposed on the X-axis guide rail 36. The column 16 moves along the X axis.

A Y-axis guide rail 34 is fixed to a front surface of the column 16. The front surface faces to the workpiece 1. The Y axis extends in a direction perpendicular to the X axis and the Z axis. The Y-axis guide rail 34 extends along the Y axis. A spindle head 18 is disposed on the Y-axis guide rail 34. The spindle head 18 is slidably formed to the Y-axis guide rail 34. The spindle head 18 moves along the Y axis. The spindle head 18 is formed to rotatably support a spindle 20.

The moving device includes a Z-axis moving device which relatively moves the substitute tool 22 to the workpiece 1 in the Z-axis direction. A Z-axis feed screw 24 is disposed below the table 14 inside the bed 12. The Z-axis feed screw 24 extends in the Z-axis direction. A nut 26 is fixed to a lower surface of the table 14. The nut 26 is screwed to the Z-axis feed screw 24. One end of the Z-axis feed screw 24 is connected to a Z-axis servomotor 25. The Z-axis servomotor 25 is driven to rotate the Z-axis feed screw 24, and thus the nut 26 moves in the Z-axis direction. The table 14 moves along the Z-axis guide rail 28 in conjunction with the movement of the nut 26. Accordingly, the workpiece 1 moves in the Z-axis direction.

The moving device includes an X-axis moving device which makes the substitute tool 22 move relative to the workpiece 1 in the X-axis direction. The X-axis moving device includes an X-axis feed screw disposed below the column 16 inside the bed 12, similar to the Z-axis moving device. The X-axis feed screw is formed to extend in the X-axis direction. A nut 37 screwed to the X-axis feed screw is fixed to a lower surface of the column 16. One end of the X-axis feed screw is connected to an X-axis servomotor 38. The X-axis servomotor 38 is driven to rotate the X-axis feed screw, and thus the nut 37 moves in the X-axis direction. The column 16 moves along the X-axis guide rail 36 in conjunction with the movement of the nut 37. Accordingly, the substitute tool 22 moves in the X-axis direction.

The moving device includes a Y-axis moving device which makes the substitute tool 22 move relative to the workpiece 1 in the Y-axis direction. A Y-axis feed screw 32 is disposed inside the column 16. The Y-axis feed screw 32 is formed to extend in the Y-axis direction. A nut 30 screwed to the Y-axis feed screw 32 is fixed to a back surface of the spindle head 18. An upper end of the Y-axis feed screw 32 is connected to a Y-axis servomotor 31. The Y-axis servomotor 31 is driven to rotate the Y-axis feed screw 32, and thus the nut 30 moves in the Y-axis direction. The spindle head 18 moves along the Y-axis guide rail 34 in conjunction with the movement of the nut 30. Accordingly, the substitute tool 22 moves in the X-axis direction.

The moving device includes a B-axis moving device which makes the substitute tool 22 move relative to the workpiece 1 around the B axis. The rotary table 42 includes a B-axis servomotor 43 which rotate the workpiece 1. The B-axis servomotor 43 is driven, and thus the workpiece 1 rotates around the B axis.

The substitute tool 22 is disposed on a tip end of the spindle 20. A flat end mill as a rotary tool is mounted as the substitute tool 22. The spindle 20 is connected to a motor 23 which rotates the substitute tool 22. The motor 23 is driven, and the substitute tool 22 rotates on a central axis of the spindle 20 as a rotation axis.

As described above, the machine tool 10 includes the linear feed axes (the X axis, the Y axis, and the Z axis) and the rotational feed axis (the B axis) and thus can make the substitute tool 22 move relative to the workpiece 1 fixed to the table 14 by operating the column 16, the spindle head 18, and the table 14 along the X-axis, the Y-axis, and the Z-axis directions. Further, the machine tool 10 can drive the rotary table 42 to rotate the workpiece 1 around the B axis. The substitute tool 22 can rotationally move relative to the workpiece 1.

Figure 2:
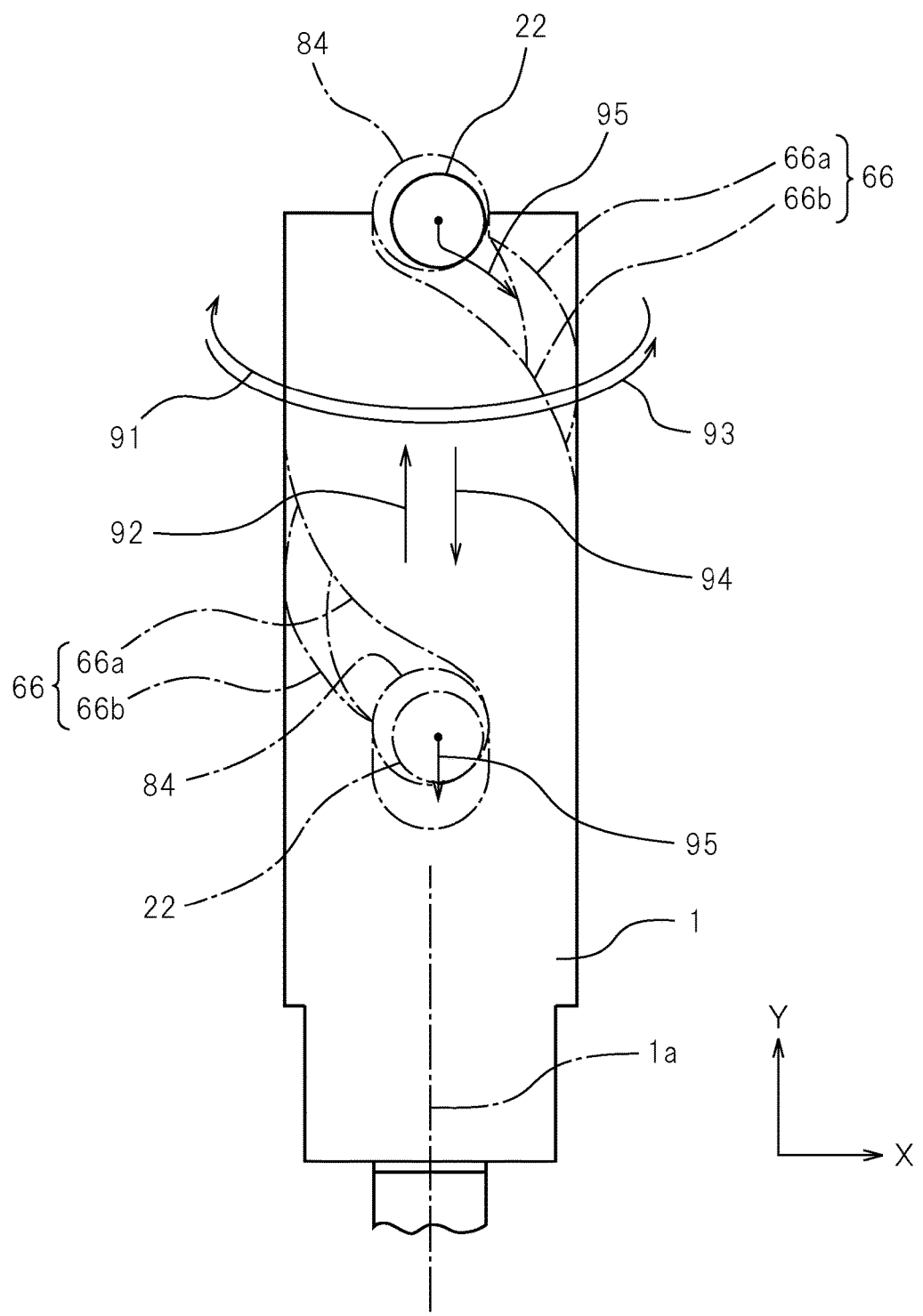
FIG. 2 is a schematic view of a workpiece and a groove portion when grooving is performed using a substitute tool.

FIG. 2 is a schematic plan view of the workpiece 1. A groove portion 66 is formed on a circumferential surface of the columnar workpiece 1. The groove portion 66 spirally extends on the surface of the workpiece 1. Grooving for forming the groove portion 66 is performed on the workpiece 1, and, for example, a cylindrical cam can be manufactured.

With reference to FIG. 1 and FIG. 2, when the groove portion 66 is formed on the workpiece 1, the workpiece 1 is fixed to the rotary table 42 in a manner that a central axis 1a of the workpiece 1 becomes parallel to the Y axis. Further, the workpiece 1 is fixed in a manner that the central axis 1a coincides with a rotation axis of the rotary table 42. In the machining of the workpiece 1, the workpiece 1 is linearly moved in the X-axis direction and the Y-axis direction and rotated around the B axis.

In the grooving of the present embodiment, cutting is performed using the substitute tool 22 having a diameter smaller than a groove width of the groove portion 66. The groove portion 66 has an approximately quadrangular cross section, a side surface 66a on one side, and a side surface 66b on the other side. The groove portion 66 is formed to have constant depth and groove width. When such a groove portion 66 is to be formed, control is performed to change respective positions of the X axis, the Y axis, and the B axis along the surface of the workpiece 1 without changing a relative position (a position of the Z axis) in a depth direction of the substitute tool 22 in cutting.

A grooving method includes a reciprocation step for reciprocating the substitute tool 22 along a shape of the groove portion 66. On an outward path of the reciprocation step, the side surface 66a on one side of the groove portion 66 is machined. As indicated by an arrow 95, the substitute tool 22 is moved relative to a direction in which the groove portion 66 extends, and the side surface 66a on one side of the groove portion 66 is machined. In the machine tool 10, the spindle 20 is moved in the Y-axis direction. The workpiece 1 is moved relative to the substitute tool 22 in the Y-axis direction as indicated by an arrow 92. Further, the workpiece 1 is moved relative to the substitute tool 22 by rotating the workpiece 1 around the central axis 1a as indicated by an arrow 91. When the substitute tool 22 reaches a predetermined end of the groove portion 66, the substitute tool 22 is moved in the X-axis direction and the Y-axis direction to be disposed on a position of a return path. Then, a direction of the relative movement is changed, and machining on the return path is performed.

On the return path of the reciprocation step, the side surface 66b on the other side of the groove portion 66 is machined. The substitute tool 22 is moved relative to the direction in which the groove portion 66 extends, and the groove portion 66 is formed. The workpiece 1 is rotated as indicated by an arrow 93 while being relatively moved to the substitute tool 22 as indicated by an arrow 94, so that the relative movement between the workpiece 1 and the substitute tool 22 is performed.

When the substitute tool 22 having a diameter smaller than the groove width of the groove portion 66 performs once the machining on the side surfaces 66a and 66b of the groove portion 66, the groove portion 66 is hardly to be formed into a desired shape, and insufficient cutting part is generated in any portion in a depth direction of the side surfaces 66a and 66b of the groove portion 66. Insufficient cutting part is described which is generated when the substitute tool 22 having a diameter smaller than the groove width of the groove portion 66 machines the side surface of the groove portion 66.

Figure 3:
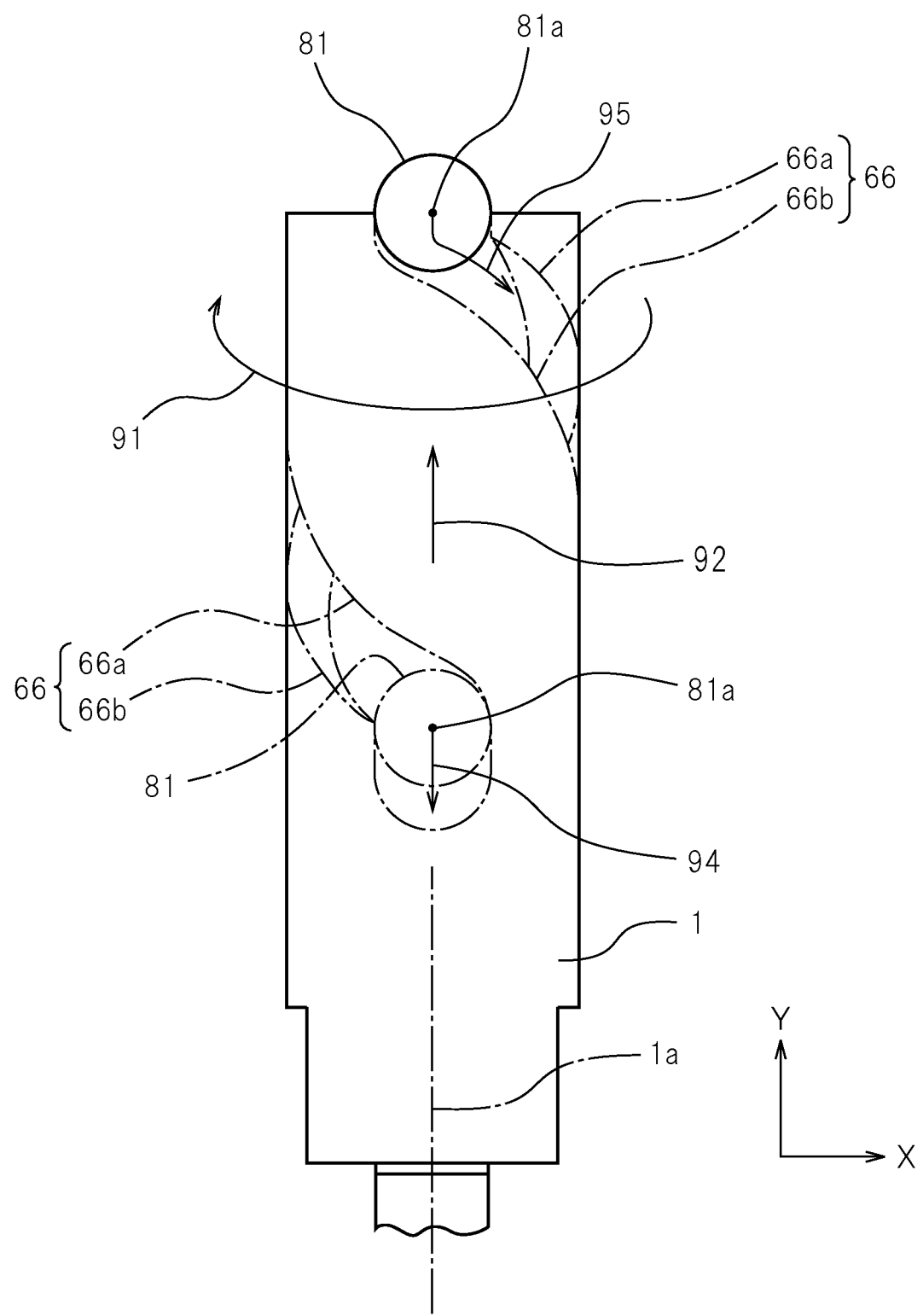
FIG. 3 is a schematic view of a workpiece and a groove portion when grooving is performed using a specified tool.

FIG. 3 is a schematic plan view of the workpiece 1 when machining is performed using the specified tool. A specified tool 81 is a rotary tool having a diameter identical to the groove width of the groove portion 66. The specified tool 81 is a flat end mill. The specified tool 81 is a rotary tool optimum to form the groove portion 66. When the specified tool 81 is used, as indicated by the arrow 95, the groove portion 66 can be formed by relatively moving the specified tool 81 once along the direction in which the groove portion 66 extends. In the machine tool 10, the workpiece 1 is rotated around the B axis while the spindle 20 is moved in the Y-axis direction. The workpiece 1 is moved relative to the specified tool 81 in the Y-axis direction as indicated by the arrow 92 and rotated around the central axis 1a as indicated by the arrow 91, accordingly the groove portion 66 can be formed.

Figure 4:
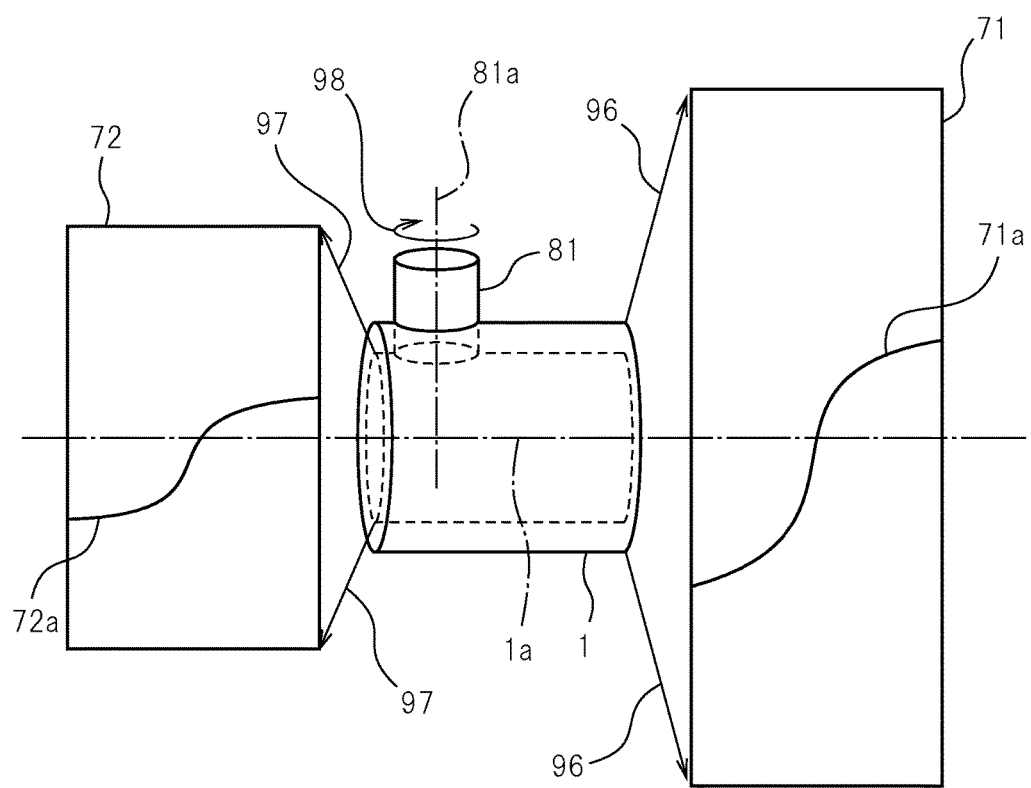
FIG. 4 is a view illustrating a trace of a central axis of the specified tool when grooving is performed using the specified tool.

FIG. 4 is a schematic view illustrating a trace of a central axis 81a of the specified tool 81 when the specified tool 81 is used. In the example illustrated in FIG. 4, the specified tool 81 is disposed so that the central axis 81a of the specified tool 81 faces a radial direction of the workpiece 1. In other words, the specified tool 81 is disposed so that the central axis 81a intersects with the central axis 1a of the workpiece 1.

The specified tool 81 rotates on the central axis 81a as indicated by an arrow 98. One end of the specified tool 81 is inserted into the workpiece 1. A development view 71 is a view that the circumferential surface of the workpiece 1 is developed as indicated by arrows 96. A trace 71a that the central axis 81a passes is depicted on the circumferential surface of the workpiece 1. The specified tool 81 has a point of a tip end on the central axis 81a, namely a tool tip end point. A development view 72 is a view that a circumferential area of the workpiece 1 which passes the tool tip end point is developed as indicated by arrows 97. A trace 72a of the tool tip end point is depicted in the development view 72.

When comparing the trace 71a of points on the tool central axis 81a on the surface of the workpiece 1 with the trace 72a of the tool tip end points, it is understood that shapes of these traces are different from each other. When the workpiece 1 rotates with respect to the specified tool 81, radii of rotation are different from each other, so that the respective traces of points are different. Thus, a relative advancing direction of the specified tool 81 to the workpiece 1 is different depending on a depth direction of the groove portion 66.

Figure 5:
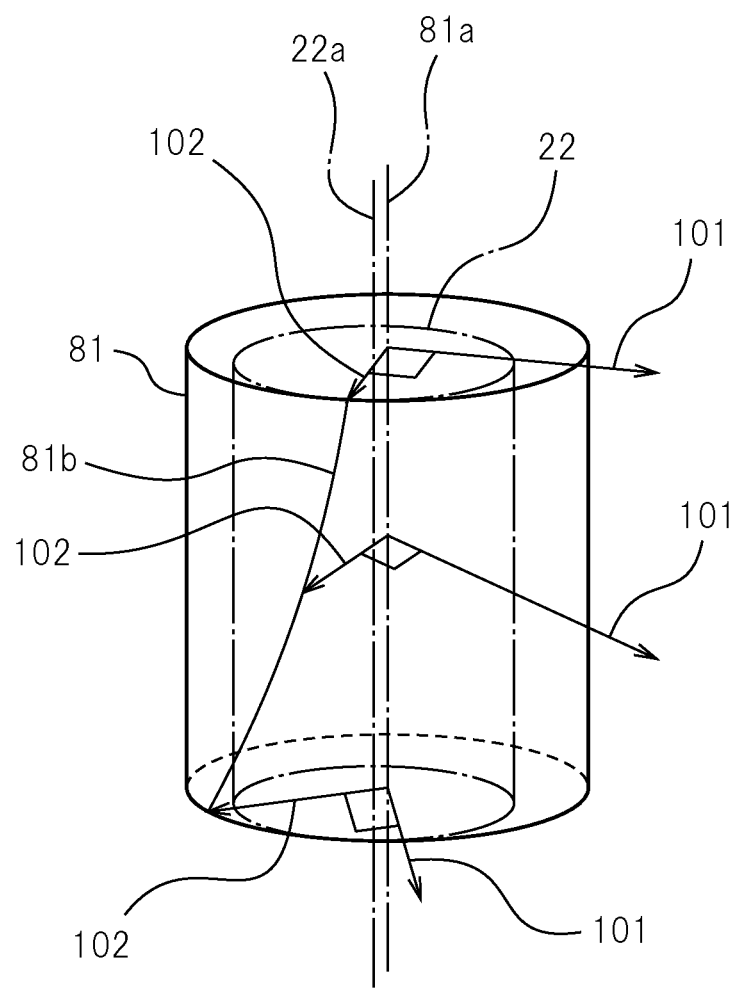
FIG. 5 is a schematic view illustrating a virtual advancing direction and a portion where a workpiece is machined when grooving is performed using the specified tool.

FIG. 5 is a schematic view illustrating a direction to which the central axis 81a moves when the specified tool 81 is moved relative to the workpiece 1. An arrow 101 indicates a virtual advancing direction of the specified tool 81 at a predetermined point in the depth direction. The virtual advancing direction is a virtual advancing direction of a tool when it is assumed that the workpiece 1 is stopped and the tool moves. It is understood that the virtual advancing direction varies in a direction to which the central axis 81a extends. In other words, it is understood that the virtual advancing direction varies in the depth direction of the groove portion 66.

An arrow 102 indicates a direction perpendicular to a direction of the arrow 101 indicating the virtual advancing direction. An intersection point of the arrow 102 and the surface of the specified tool 81 is a contact portion 81b. The contact portion 81b is a portion forming the side surfaces 66a and 66b of the groove portion 66. In addition, the contact portion 81b is equivalent to a line finally generating a machining surface of the workpiece when the workpiece is machined, which is described below. In the example illustrated in FIG. 5, the line of the contact portion 81b is not parallel to the central axis 81a of the specified tool 81. In the example illustrated in FIG. 5, the line of the contact portion 81b is curved, however, a contact portion may be linear.

When the substitute tool 22 having a tool diameter smaller than that of the specified tool 81 is used, the substitute tool 22 can be disposed so that a central axis 22a is parallel to the central axis 81a of the specified tool 81. Further, the substitute tool 22 can be disposed in a manner that a surface of the substitute tool 22 is in contacts a position of the surface of the specified tool 81, when the specified tool 81 is used. In this case, the central axis 22a of the substitute tool 22 is on a position shifted from the central axis 81a of the specified tool 81. No matter how a position of the central axis 22a is selected, it is impossible for the surface of the substitute tool 22 to pass through all of the contact portions 81b in one-time machining. Thus, when cutting is performed by disposing the substitute tool 22, insufficient cutting part is generated in some areas in the depth direction of the groove portion 66. The grooving of the present embodiment has characteristics that if it intends to form the side surface 66a or the side surface 66b of the groove portion 66 in one-time machining using the substitute tool 22, a desired side surface shape is not gained. Accordingly, machining is performed for a plurality of times by changing a relative position of the substitute tool 22 to the workpiece 1 in order to form the side surface of the groove portion 66.

Figure 6:
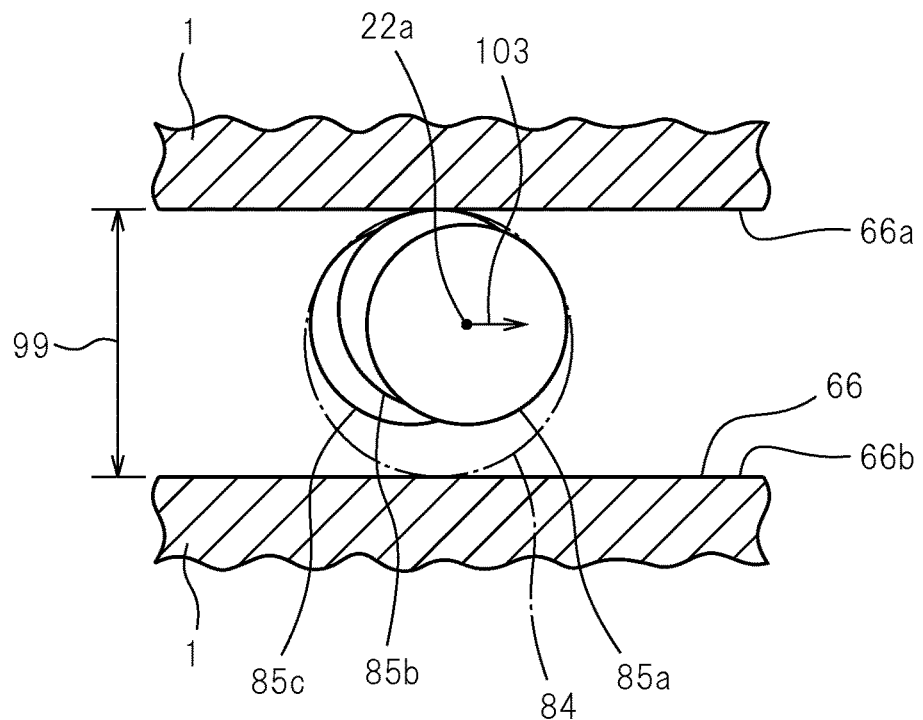
FIG. 6 is a schematic cross-sectional view illustrating when grooving is performed using the substitute tool.

FIG. 6 is a schematic cross-sectional view illustrating the grooving using the substitute tool 22. In the grooving, the substitute tool 22 is used of which diameter is smaller than the groove width of the groove portion 66 indicated by an arrow 99. In other words, the substitute tool 22 is used in place of the specified tool 81. FIG. 6 illustrates machining of the side surface 66a on one side of the groove portion 66 as an example.

A tilt of the substitute tool 22 is set so that the central axis 22a of the substitute tool 22 is parallel to the depth direction of the groove portion 66.

In other words, the tilt of the substitute tool 22 is set so that a central axis of a circle 84 for disposing the substitute tool 22 is parallel to a rotation axis of the substitute tool 22.

In the grooving method, the machining is performed for a plurality of times by gradually changing a position of the substitute tool 22 to the side surface 66a on one side of the groove portion 66. In the example illustrated in FIG. 6, the substitute tool 22 is disposed on a position 85a in the machining of the side surface 66a of a first time. Then, as indicated by an arrow 103, the substitute tool 22 is moved relative along the direction in which the groove portion 66 extends. In the machining of the side surface 66a of a second time, the substitute tool 22 is disposed on a position 85b and relatively moved along the direction in which the groove portion 66 extends. Further, in the machining of the side surface 66a of a third time, the substitute tool 22 is disposed on a position 85c and relatively moved along the direction in which the groove portion 66 extends. Each of the positions 85a, 85b, and 85c is set to be inscribed to the circle 84 of which diameter is the groove width of the groove portion 66. In other words, the substitute tool 22 is disposed so that the surface of the substitute tool 22 is in contacts a position of the surface of the specified tool 81 when the specified tool 81 is used.

In the machining on a return path, similar to the machining on the outward path, the machining is performed for a plurality of times by changing the position of the substitute tool 22 to form the side surface 66b on the other side of the groove portion 66.

In the present embodiment, the machining is performed three times by changing the position of the substitute tool 22 on the outward path and the return path. An arbitrary number of times can be selected as the number of machining times for forming a side surface. When the number of machining times increases, a scallop height can be reduced as described below. In other words, machining accuracy of a groove portion can be improved.

Figure 7:
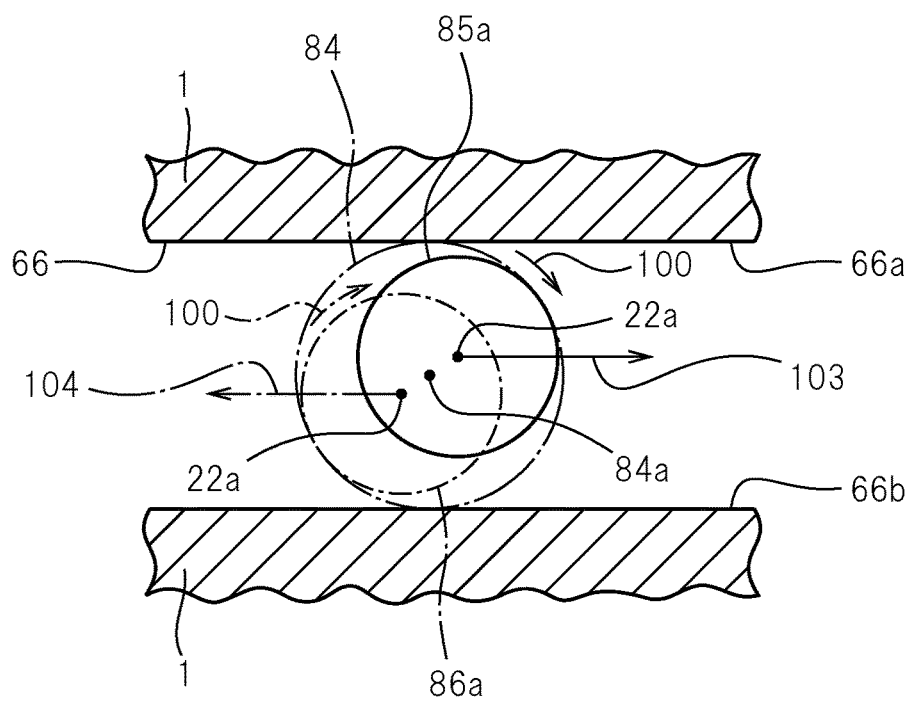
FIG. 7 is a schematic view illustrating machining on an outward path and a return path in grooving of a first time.

FIG. 7 is a schematic cross-sectional view illustrating positions of the substitute tool 22 on the outward path and on the return path in the machining of the first time. An arrow 100 indicates a rotating direction of the substitute tool 22, and the same rotation direction is used on both of the outward path and the return path. In the machining on the outward path of the first time, the substitute tool 22 is disposed on the position 85a. The substitute tool 22 is moved along an extending shape of the groove portion 66 as indicated by the arrow 103, and the machining is performed on the side surface 66a on one side. In the machining on the return path of the first time, the substitute tool 22 is disposed on a position 86a. The substitute tool 22 is moved along the extending shape of the groove portion 66 as indicated by an arrow 104, and the machining is performed on the side surface 66b on the other side.

Figure 8:
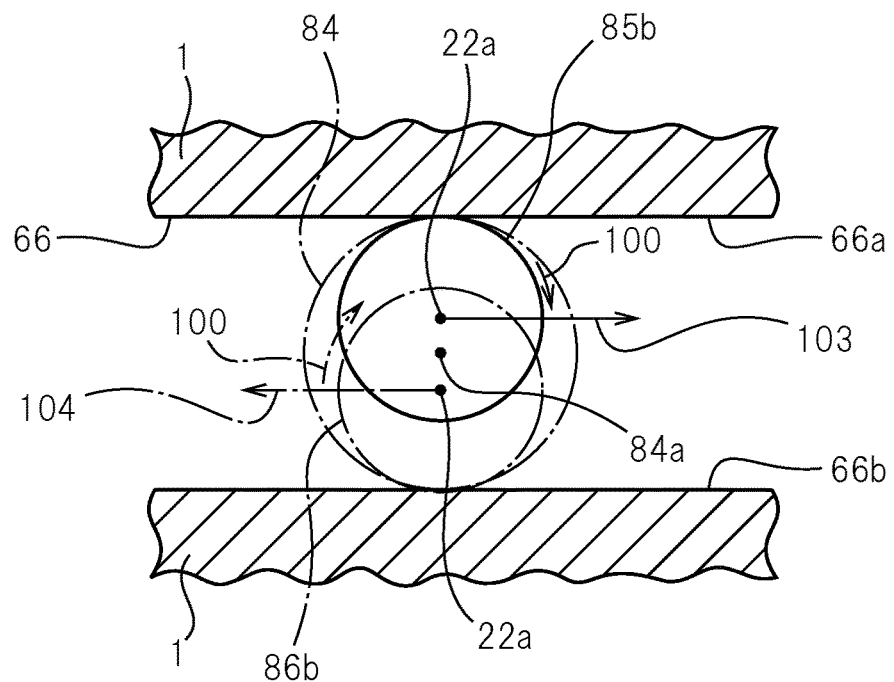
FIG. 8 is a schematic view illustrating machining on the outward path and the return path in the grooving of a second time.

FIG. 8 is a schematic cross-sectional view illustrating positions of the substitute tool 22 on the outward path and on the return path in the machining of the second time. In the machining of the second time, the substitute tool 22 is disposed on the position 85b on the outward path and moved in a direction indicated by the arrow 103, so that the side surface 66a on one side is machined. On the return path, the substitute tool 22 is disposed on a position 86b and moved in a direction indicated by the arrow 104, so that the side surface 66b on the other side is machined.

Figure 9:
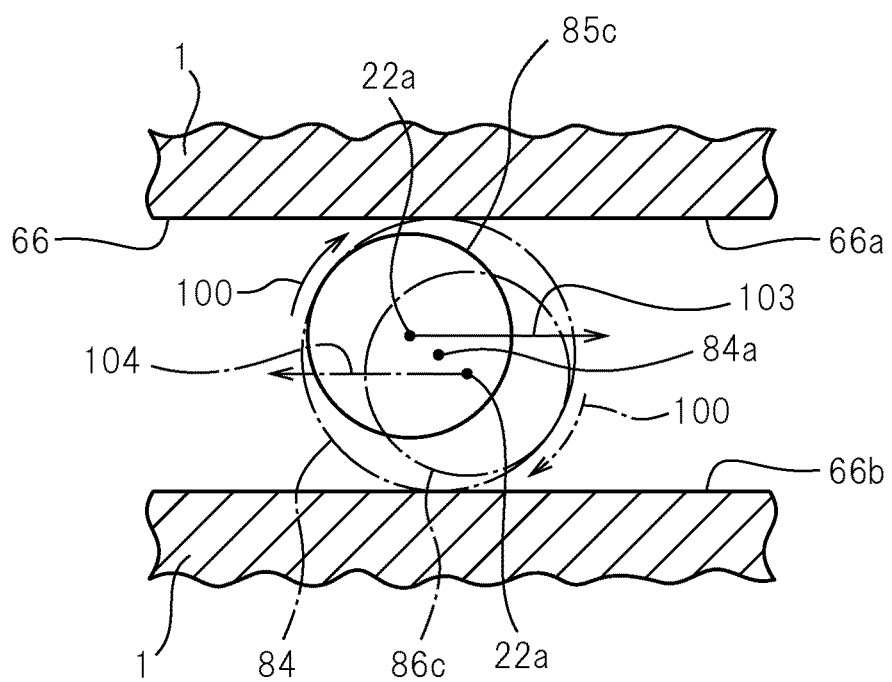
FIG. 9 is a schematic view illustrating machining on the outward path and the return path in the grooving of a third time.

FIG. 9 is a schematic cross-sectional view illustrating positions of the substitute tool 22 on the outward path and on the return path in the machining of the third time. In the machining of the third time, similar to the machining of the first time and the second time, the substitute tool 22 is also disposed on the position 85c on the outward path to perform the machining on the side surface 66a on one side and is disposed on the position 86c on the return path to perform the machining on the side surface 66b on the other side.

Figure 10:
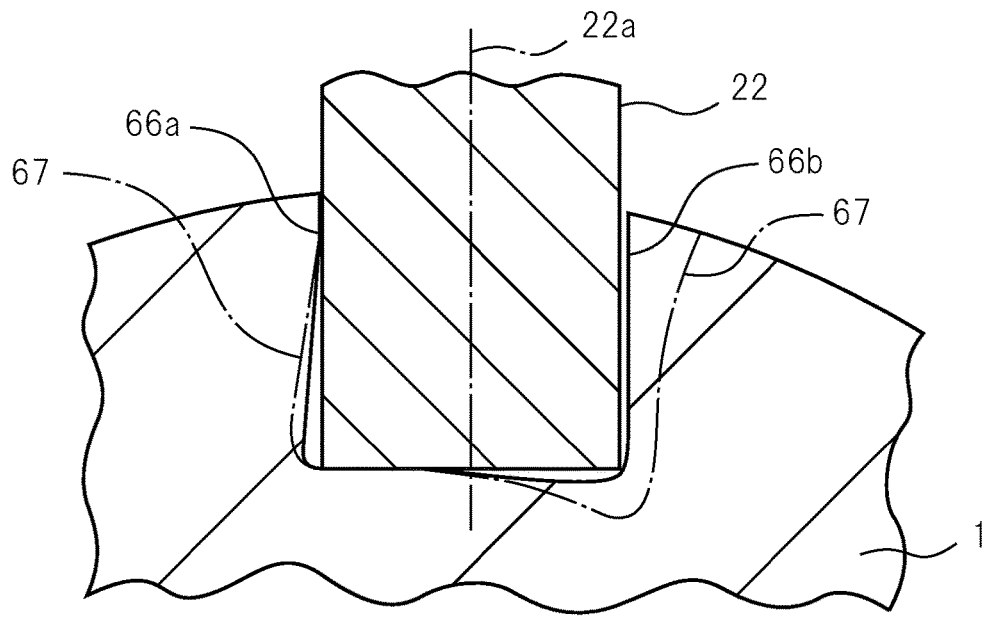
FIG. 10 is a schematic cross-sectional view illustrating machining on the outward path in the grooving of the first time.
Figure 11:
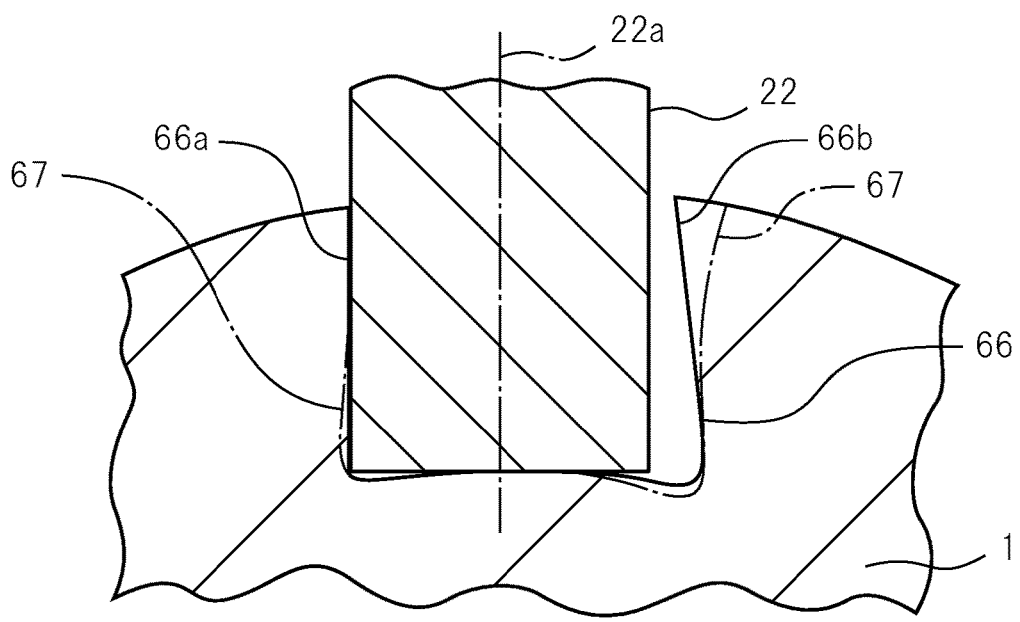
FIG. 11 is a schematic cross-sectional view illustrating machining on the outward path in the grooving of the second time.
Figure 12:
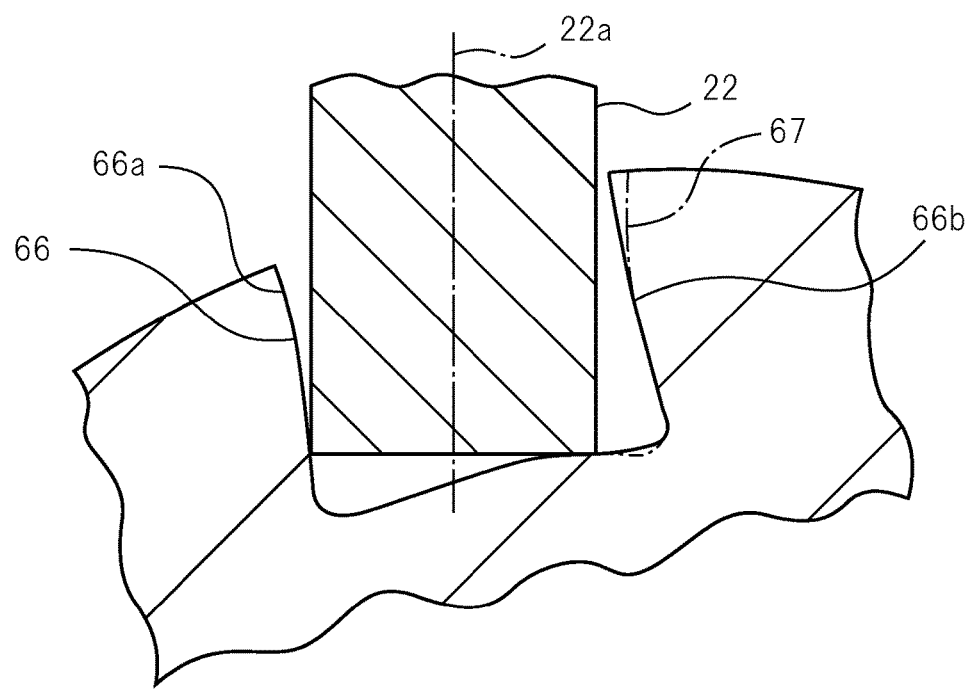
FIG. 12 is a schematic cross-sectional view illustrating machining on the outward path in the grooving of the third time.

FIG. 10 is a schematic cross-sectional view illustrating when the machining of the first time is performed on the outward path. FIG. 11 is a schematic cross-sectional view illustrating when the machining of the second time is performed on the outward path. FIG. 12 is a schematic cross-sectional view illustrating when the machining of the third time is performed on the outward path. Each drawing illustrates a machining surface 67 having a shape desired by a user. The machining is performed for a plurality of times to match the side surface 66a of the groove portion 66 with the machining surface 67.

With reference to FIG. 10, an upper portion of the side surface 66a on one side can be cut so as to be almost identical to the machining surface 67 in the machining on the outward path of the first time. However, at a central portion and a lower portion of the side surface 66a on one side, it is difficult to perform the machining up to the machining surface 67, and insufficient cutting part is generated. With reference to FIG. 11, the machining can be performed so as to bring the central portion of the side surface 66a on one side close to the machining surface 67 in the machining on the outward path of the second time. With reference to FIG. 12, the insufficient cutting part on the lower portion of the side surface 66a on one side can be cut in the machining on the outward path of the third time. Accordingly, the groove portion 66 can match the machining surface 67 having the desired shape. In the machining on the return path, similar to the machining on the outward path, the side surface 66b on the other side of the groove portion 66 can match the machining surface 67 by the machining performed for a plurality of times.

As described above, the grooving method includes a machining step for machining the workpiece 1 by relatively moving the substitute tool 22 in the tool path along the direction in which the groove portion 66 extends. In the machining step, the substitute tool 22 is disposed to be inscribed to the circle 84 of which diameter is the groove width of the groove portion 66 to be formed on the workpiece 1. The machining is performed for a plurality of times by changing the relative position of the substitute tool 22 to the workpiece 1. Adopting the method enables the machining of a groove portion to be performed with high accuracy without using a rotary tool having a diameter identical to a groove width.

Next, the control device of the machine tool is described which perform the grooving method according to the present embodiment.

Figure 13:
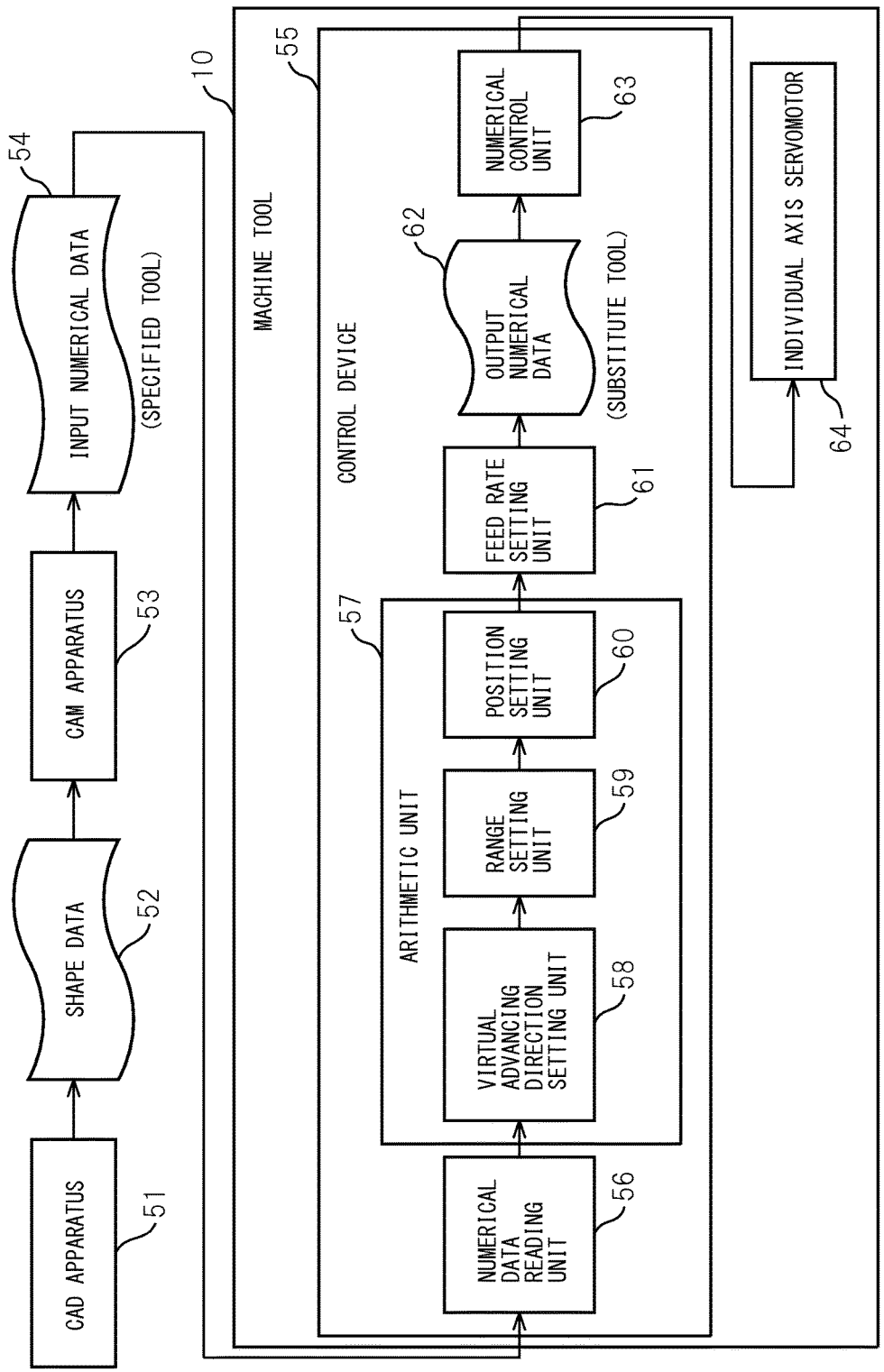
FIG. 13 is a schematic view of a machining system which machines a workpiece using the substitute tool.

FIG. 13 is a schematic view of a machining system which includes the machine tool 10 and a device for generating input numerical data 54 input to the machine tool 10. A CAD (Computer Aided Design) apparatus 51 designs a shape of the workpiece 1. The CAD apparatus 51 supplies shape data 52 of the workpiece 1 to a CAM (Computer Aided Manufacturing) apparatus 53. The shape data 52 includes shape data of the groove portion 66 to be formed on the workpiece 1. A user can input information of the specified tool 81 to the CAM apparatus 53. The information of the specified tool 81 having a diameter identical to the groove width of the groove portion 66 is input. The specified tool 81 may be automatically specified by the CAM apparatus 53.

In the CAM apparatus 53, the input numerical data 54 as input information to be input to the control device 55 of the machine tool 10 is generated based on the shape data 52. The input numerical data 54 is numerical data for forming a groove portion using the specified tool 81 having the diameter identical to the groove width of the groove portion 66.

The numerical control type machine tool 10 includes the control device 55. The control device 55 includes an arithmetic processing device. The arithmetic processing device includes a microprocessor (CPU) performing arithmetic processing and the like, a ROM (Read Only Memory) and a RAM (Random Access Memory) as storage devices, and other peripheral circuits.

The control device 55 generates output numerical data 62 using the input numerical data 54. The output numerical data 62 includes an instruction issued to a machine when the substitute tool 22 having a tool diameter smaller than that of the specified tool 81 is used. The output numerical data 62 includes information of tool paths on which machining is performed for a plurality of times to form the groove portion 66. The output numerical data 62 includes numerical data for relatively moving the substitute tool 22 to the workpiece 1.

The control device 55 includes a numerical data reading unit 56 serving as an input information reading unit and an arithmetic unit 57. The numerical data reading unit 56 has a function of reading the input numerical data 54. The arithmetic unit 57 includes a virtual advancing direction setting unit 58, a range setting unit 59, and a position setting unit 60. The arithmetic unit 57 sets a position on which the substitute tool 22 is disposed based on the read input numerical data 54. In other words, the arithmetic unit 57 sets a tool path of the substitute tool. Further, the arithmetic unit 57 estimates a line of the substitute tool 22 which finally generates a machining surface. A feed rate setting unit 61 calculates a relative speed of the substitute tool 22 to the workpiece 1 based on the tool path and the line which finally generates the machining surface calculated by the arithmetic unit 57. In other words, the feed rate regarding each of the moving axes of the machine tool 10 is determined. The feed rate setting unit 61 generates the output numerical data 62. The output numerical data 62 is input to a numerical control unit 63. The numerical control unit 63 drives an individual axis servomotor 64 based on the output numerical data 62. The individual axis servomotor 64 includes the X-axis servomotor 38, the Y-axis servomotor 31, the Z-axis servomotor 25, and the B-axis servomotor 43.

Figure 14:
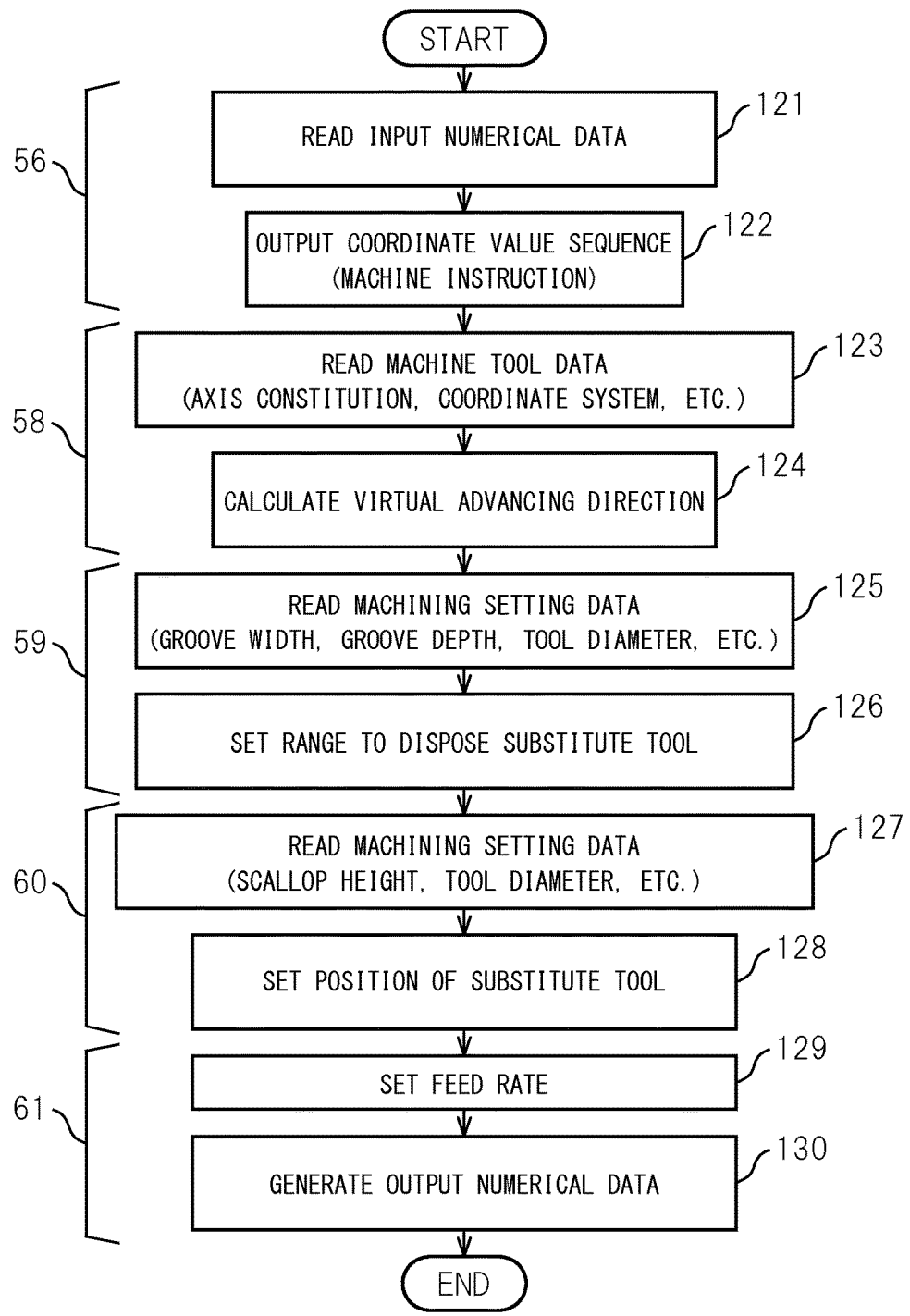
FIG. 14 is a flowchart illustrating control by the control device of the machine tool.

FIG. 14 is a flowchart illustrating control by the control device 55 of the machine tool 10. With reference to FIG. 13 and FIG. 14, the input numerical data 54 generated by the CAM apparatus 53 is input to the numerical data reading unit 56 of the control device 55. The input numerical data 54 includes data indicating a path of the tool tip end point when the specified tool 81 is used. In other words, the tool path of the specified tool 81 is included. The input numerical data 54 includes, for example, coordinate values of the XYZ axes and rotational angles of ABC axes. The input information to be input to the control device 55 is not limited to the above-described numerical data pieces, and input information indicating a path of an arbitrary portion of the specified tool can be adopted.

First, in step 121, the control device 55 reads the input numerical data 54 by the numerical data reading unit 56. In step 122, a coordinate value sequence is output. The coordinate value sequence includes the coordinate values of the XYZ axes and the rotational angles of the ABC axes.

Next, the arithmetic unit 57 sets a tool path on which machining is performed using the substitute tool 22 having a diameter smaller than that of the specified tool 81. In step 123, the virtual advancing direction setting unit 58 of the arithmetic unit 57 reads data of the machine tool 10. The data of the machine tool 10 includes an axis constitution and a coordinate system of the machine tool 10 and so on. Next, in step 124, the virtual advancing direction setting unit 58 calculates the virtual advancing direction.

Figure 15:
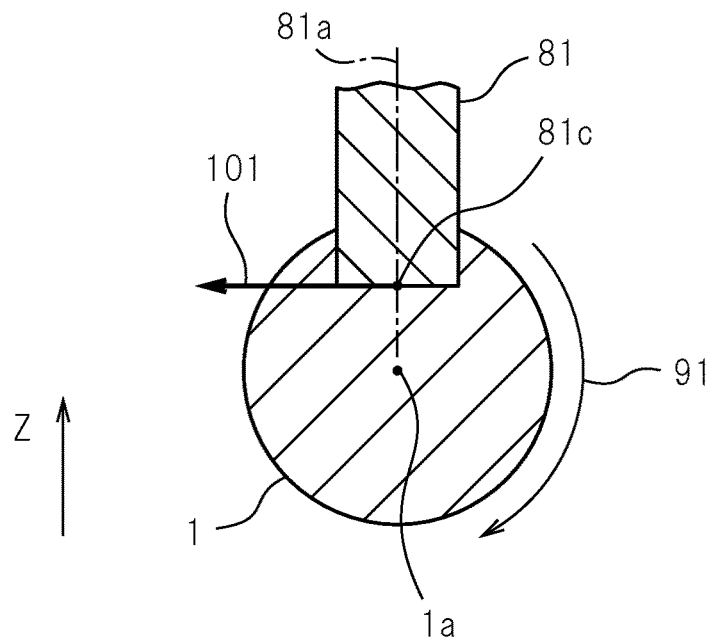
FIG. 15 is a schematic cross-sectional view illustrating a virtual advancing direction of the specified tool.

FIG. 15 is a schematic cross-sectional view illustrating the virtual advancing direction. The virtual advancing direction is an advancing direction of the specified tool 81 with respect to the workpiece 1 when it is assumed that the workpiece 1 is stopped. For the virtual advancing direction, directions that a plurality of points advances on each height of the specified tool 81 can be adopted. In the example illustrated in FIG. 15, the workpiece 1 is rotated in a direction indicated by an arrow 91 without changing the position of the specified tool 81. In other words, the central axis 81a of the specified tool 81 is in a stopped state, and the workpiece 1 is rotated. If it is assumed that the workpiece 1 is stopped in this state, the virtual advancing direction of a tool tip end point 81c of the specified tool 81 is a direction indicated by the arrow 101. The virtual advancing direction is set by, for example, a vector of a unit length on the XYZ axes.

Figure 16:
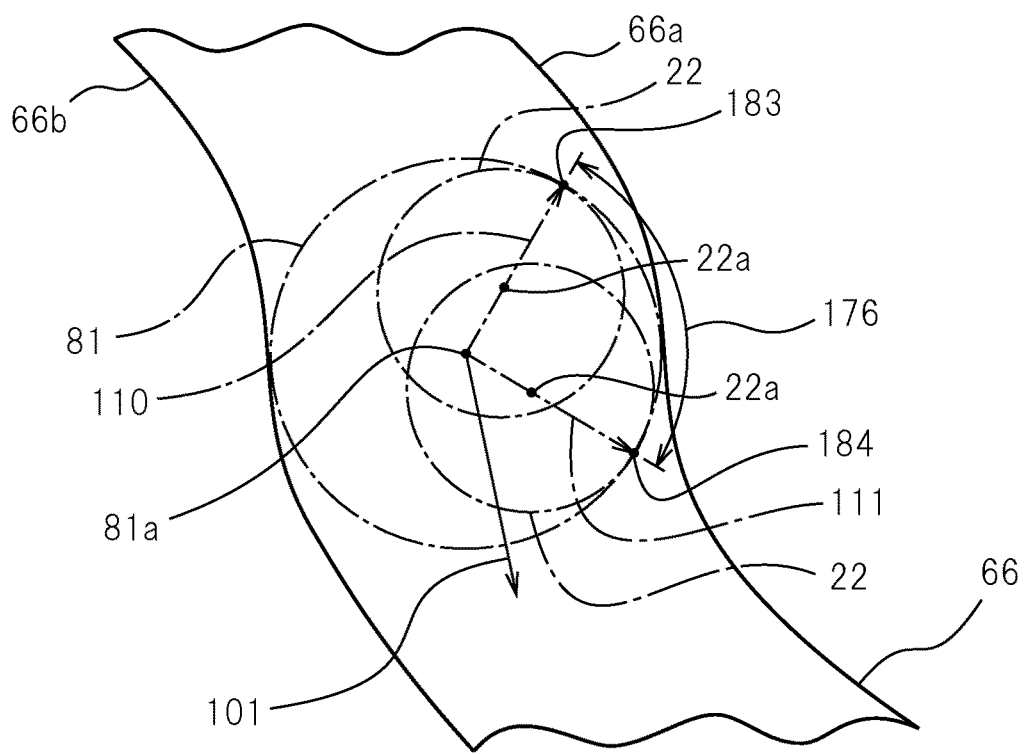
FIG. 16 is a schematic view illustrating the virtual advancing direction of the specified tool and a range in which the substitute tool is disposed.

FIG. 16 is a schematic plan view illustrating when the grooving is performed. The virtual advancing direction of a point on a predetermined height of the specified tool 81 is indicated by the arrow 101. The virtual advancing direction indicates a direction when the specified tool 81 having the diameter identical to the diameter of the circle 84 advances along the direction in which the groove portion 66 extends.

With reference to FIG. 13 and FIG. 14, up to step 124, the virtual advancing direction is calculated on the assumption that the specified tool 81 is used. Next, a tool path of the substitute tool 22 is set based on the virtual advancing direction of the specified tool 81. The range setting unit 59 of the control device 55 sets a range in which the substitute tool 22 is disposed.

In step 125, the range setting unit 59 reads machining setting data. The machining setting data includes information of the workpiece, such as the groove width of the groove portion 66 and depth of the groove portion 66, the tool diameter of the substitute tool 22, and the like. The machining setting data further includes a feed rate of the tool on a machining surface set by a user. In other words, a relative speed of the tool to the workpiece is set. A desired relative speed of a tool to a workpiece may be input by a user to the CAM apparatus 53 and be included in the input numerical data 54. Alternatively, the desired relative speed may be automatically specified by the CAM apparatus 53.

The machining setting data may include data limiting a position where a tool contacts with a workpiece. For example, in the machining by the substitute tool 22, one of two side surfaces of the groove portion 66 is machined. When a position in which the substitute tool 22 contacts the workpiece is not restricted, it may be judged that the substitute tool 22 machines both side surfaces of the groove portion at once. In such a case, the substitute tool can be specified to contact only one side surface.

In step 126, the range setting unit 59 sets the range in which the substitute tool 22 is disposed using the machining setting data and the virtual advancing direction. The range setting unit 59 estimates a line of the specified tool 81 which finally generates a machining surface based on the virtual advancing direction. The range setting unit 59 sets the range in which the substitute tool 22 is disposed based on the line which finally generates the machining surface. The line which finally generates the machining surface is described below.

Figure 17:
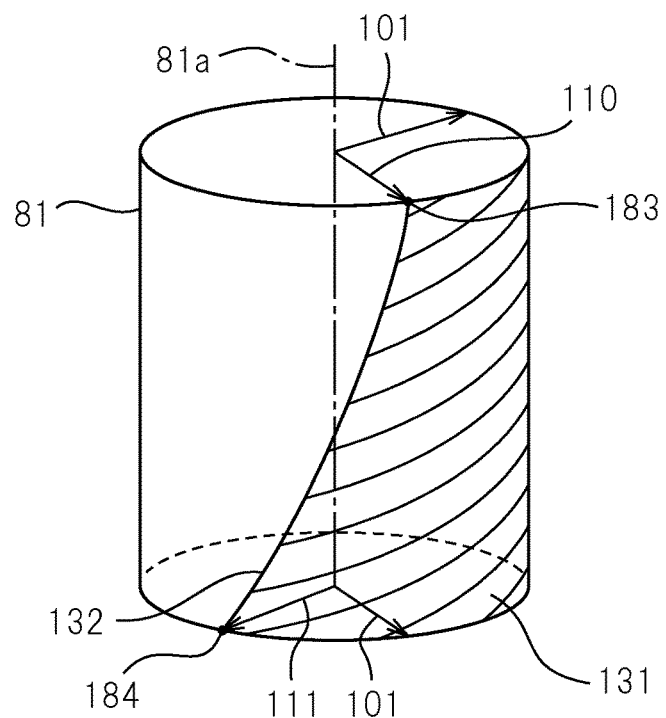
FIG. 17 is a schematic perspective view illustrating a machining area of the specified tool and a line which finally generates a machining surface.

FIG. 17 is a schematic perspective view of the specified tool. FIG. 17 illustrates a portion of the specified tool 81 where actually performs machining. For example, an upper end of the specified tool 81 illustrated in FIG. 17 is equivalent to an upper end of a groove portion. As described above, the virtual advancing direction indicated by the arrow 101 gradually changes depending on a position in a height direction of the central axis 81a of the specified tool 81.

An intersection point of a direction of a point on the central axis 81a perpendicular to the virtual advancing direction and the surface of the specified tool 81 is a point on which the specified tool 81 is finally in contact with the workpiece 1 when machining the workpiece 1. When the points are connected, a line 132 of the specified tool 81 which finally generates the machining surface is obtained.

The virtual advancing direction changes in an axial direction of the specified tool 81, and thus the line 132 which finally generates the machining surface is not approximately parallel to the central axis 81a of the specified tool 81 but twisted with respect to the central axis 81a. Further, in the example illustrated in FIG. 17, the line 132 which finally generates the machining surface is curved.

When the specified tool 81 moves to the virtual advancing direction indicated by the arrow 101, cutting of the workpiece can be performed on a partial area on the surface of the specified tool 81. The specified tool 81 includes a machining area 131 for forming a machining surface of the workpiece. The machining area 131 in which the workpiece is actually machined is set on a side to which the virtual advancing direction advances than the line 132. The groove portion 66 can be formed by cutting the workpiece 1 in the machining area 131. An end of the machining area 131 becomes a portion which finally generates the machining surface. In this example, a portion finally performing the machining is the line 132 which finally generates the machining surface.

The line 132 which finally generates the machining surface can be estimated by calculation. As indicated by arrows 110 and 111, a line perpendicular to the calculated virtual advancing direction is set. Moving points 183 and 184 are calculated which are intersection points of the line and the surface of the specified tool 81. Similarly, a point on the surface of the specified tool 81 is calculated regarding each of a plurality of points on the central axis 81a, so that the line 132 which finally generates the machining surface can be estimated.

Next, the range in which the substitute tool 22 is disposed is set based on the line 132 which finally generates the machining surface.

Figure 18:
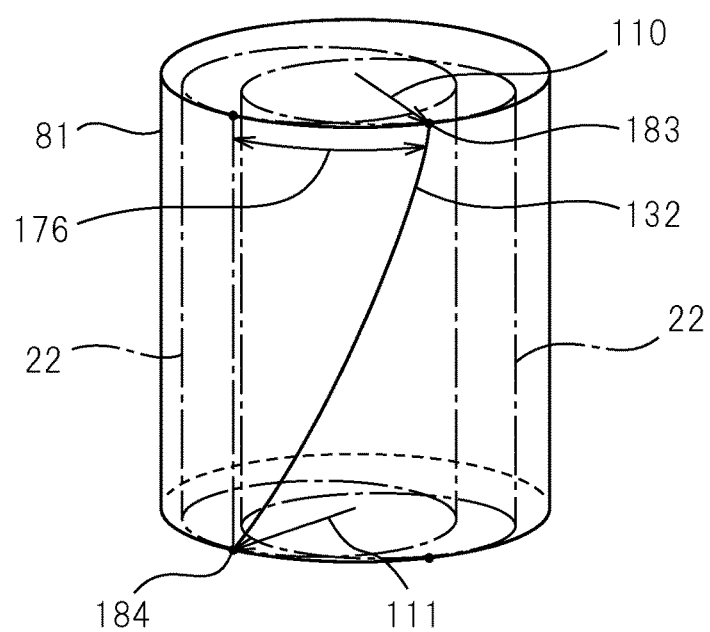
FIG. 18 is a schematic perspective view of the specified tool and the substitute tool illustrating a position on which the substitute tool is disposed.

FIG. 18 is a schematic perspective view illustrating the range in which the substitute tool is disposed. With reference to FIG. 16 and FIG. 18, the substitute tool 22 is disposed in a manner that the surface of the substitute tool 22 is in contact with the surface of the specified tool 81 when the specified tool 81 is used. The substitute tool 22 is disposed to correspond to the line 132 of the specified tool 81 which finally generates the machining surface. An area between the moving point 183 of an upper end and the moving point 184 of a lower end of the line 132 which finally generates the machining surface can be set as the range in which the substitute tool 22 is disposed. The range in which the substitute tool 22 is disposed is indicated by an arrow 176.

With reference to FIG. 13 and FIG. 14, next, the position setting unit 60 sets a position on which the substitute tool 22 is disposed within the range in which the substitute tool 22 is disposed. In step 127, the position setting unit 60 reads the machining setting data. The machining setting data read here includes a scallop height, the tool diameter of the substitute tool, and the like.

Figure 19:
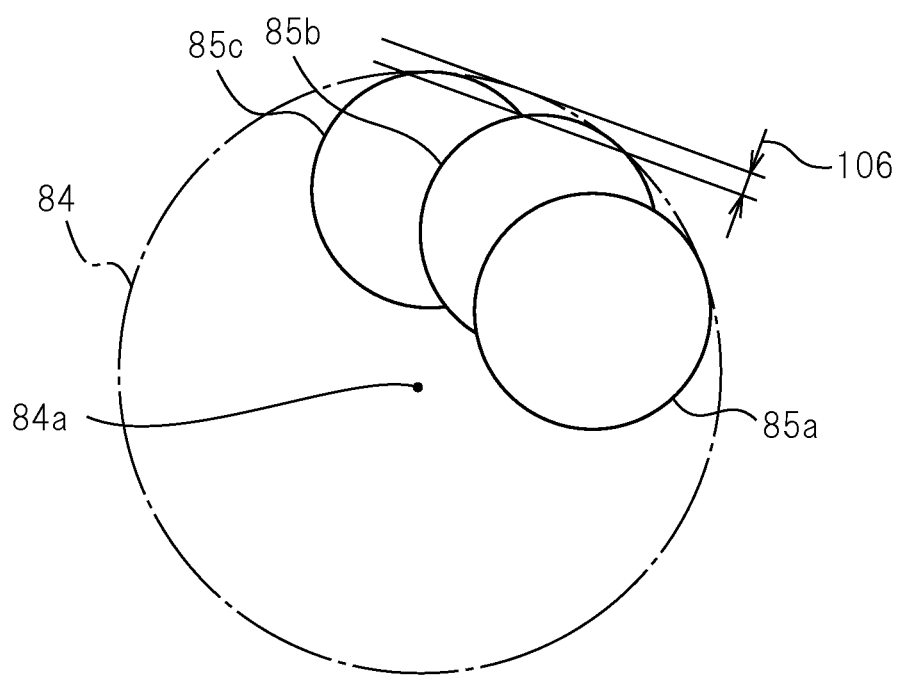
FIG. 19 is a schematic view illustrating a scallop height when a workpiece is machined.

FIG. 19 is a schematic view illustrating the scallop height. The positions 85*a*, 85*b*, and 85*c* of the substitute tool 22 are set to be inscribed to the circle 84. Thus, the scallop height indicated by an arrow 106 is determined according to the number of the positions on which the substitute tool 22 is disposed. The scallop height also depends on the diameter of the substitute tool 22. For example, the number of positions on which the substitute tool 22 is disposed is increased within the range in which the substitute tool 22 is disposed. An interval between positions on which the substitute tool 22 is disposed is decreased, so that the scallop height can be lessened. In other words, when the number of times to machine the side surface of the groove portion is increased, the scallop height can be lessened.

With reference to FIG. 13 and FIG. 14, in step 128, the position of the substitute tool 22 can be set based on the input machining setting data, such as the scallop height and the like. The number of positions on which the substitute tool 22 is disposed can be calculated based on the scallop height. In the process of the present embodiment, the machining is set to three times. When an allowable value of the scallop height is specified, a plurality of positions of the substitute tool 22 can be set within the range in which the substitute tool 22 is disposed. The position of the substitute tool 22 can be output as, for example, the coordinate values of the XYZ axes and the angle of the rotational feed axis at the tool tip end point or a difference from the coordinate value sequence output in step 122.

Next, in step 129, the feed rate setting unit 61 sets the relative speed of the substitute tool 22 to the workpiece 1. In other words, the feed rate regarding the moving axis of the machine tool is set. In the present embodiment, a movement speed in the Y-axis direction and a rotational speed around the B axis are set. In step 129, a fastest moving point at which a relative speed of the substitute tool 22 to the workpiece 1 is the maximum is estimated among a plurality of moving points included in the line which finally generates the machining surface. Then, the feed rate regarding the moving axis of the machine tool is set so that the relative speed of the fastest moving point is a preliminarily specified relative speed or less. In this example, the relative speed is set for each block described in the input numerical data.

Figure 20:
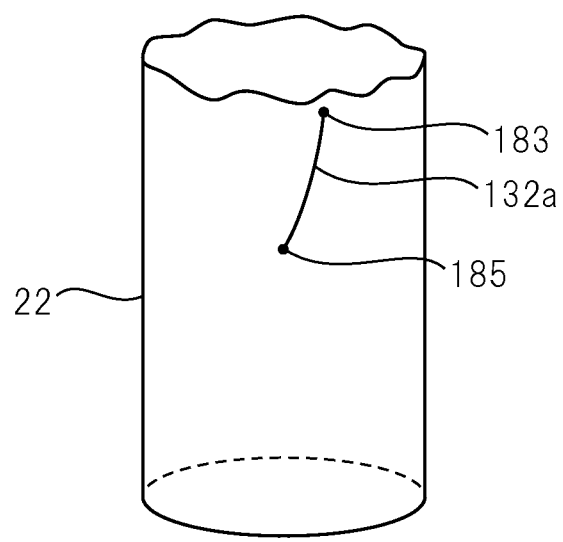
FIG. 20 is a view illustrating a line of the substitute tool which finally generates a machining surface in the machining on the outward path in the grooving of the first time.
Figure 21:
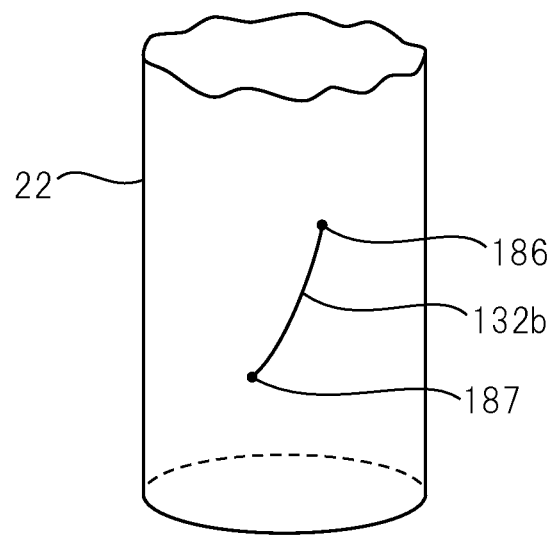
FIG. 21 is a view illustrating a line of the substitute tool which finally generates a machining surface in the machining on the outward path in the grooving of the second time.
Figure 22:
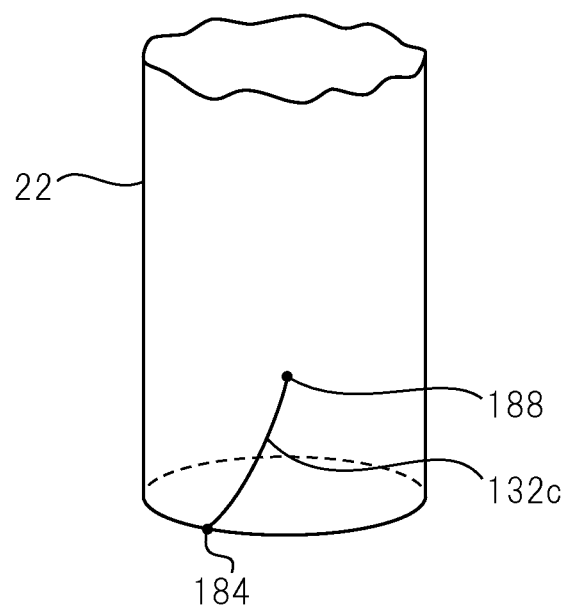
FIG. 22 is a view illustrating a line of the substitute tool which finally generates a machining surface in the machining on the outward path in the grooving of the third time.

FIG. 20 is a schematic perspective view of the substitute tool 22 when the machining of the first time is performed on the outward path. FIG. 21 is a schematic perspective view of the substitute tool 22 when the machining of the second time is performed on the outward path. FIG. 22 is a schematic perspective view of the substitute tool 22 when the machining of the third time is performed on the outward path. When the substitute tool 22 is used, a line of the substitute tool 22 which finally generates a machining surface is also generated. With reference to FIG. 20, in the machining of the first time by the substitute tool 22, a line 132*a* of the substitute tool 22 which finally generates the machining surface is formed on an upper area of the groove portion. With reference to FIG. 21, in the machining of the second time by the substitute tool 22, a line 132*b* of the substitute tool 22 which finally generates the machining surface is formed on a center area of the groove portion. With reference to FIG. 22, in the machining of the third time by the substitute tool 22, a line 132*c* of the substitute tool 22 which finally generates the machining surface is formed on a lower area of the groove portion.

When the lines 132*a*, 132*b*, and 132*c*, respectively illustrated in FIG. 20 to FIG. 22, which finally generate the machining surface are combined, a line can be formed which corresponds to the line 132 which finally generates the machining surface when the specified tool 81 performs the machining.

Figure 23:
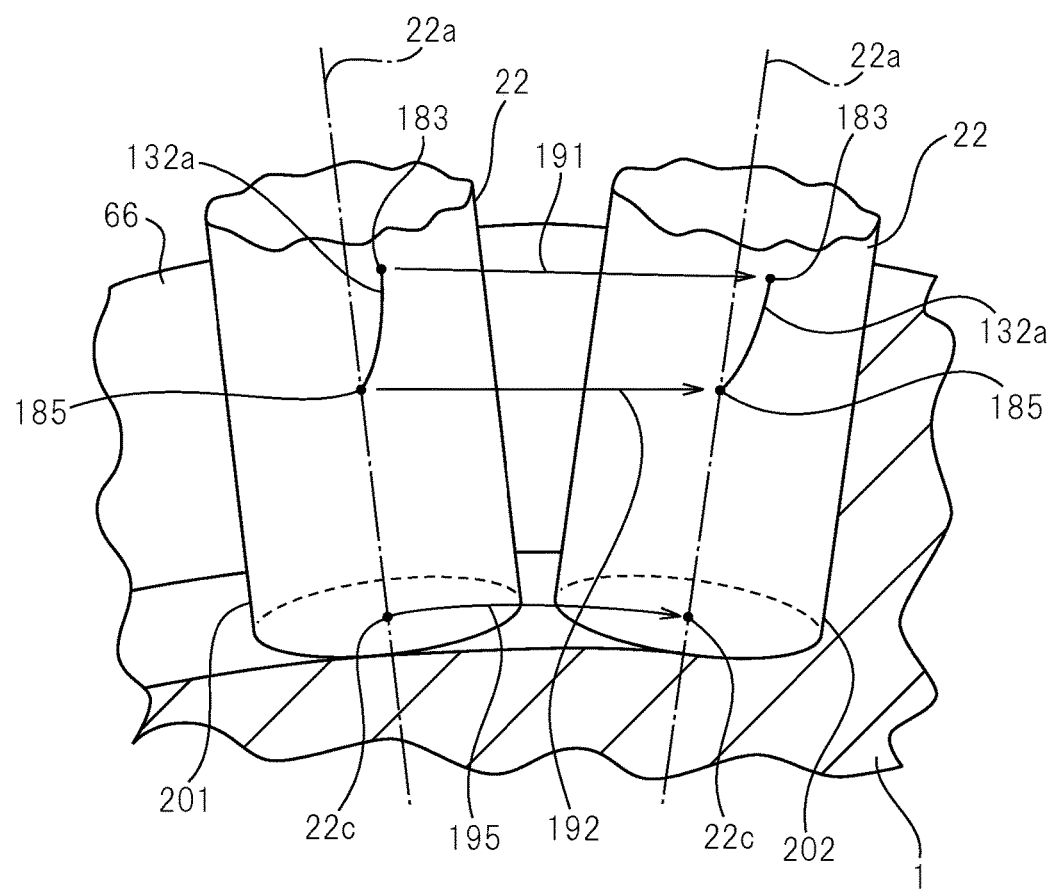
FIG. 23 is a schematic perspective view illustrating the substitute tool disposed on a first relative position and a second relative position in a tool path of the substitute tool.

FIG. 23 is a schematic perspective view of the substitute tool 22 disposed on a predetermined position in the machining on the outward path of the first time. The input numerical data input to the arithmetic unit includes a plurality of relative positions of the tool to the workpiece. FIG. 23 illustrates the substitute tool 22 disposed on a first relative position 201 and a second relative position 202 in the tool path. The first relative position 201 is a position described in a specific block in the coordinate value sequence output in step 122 in FIG. 14. The second relative position 202 is a position described in a block immediately behind the specific block. In other words, two positions of the substitute tool 22 are equivalent to positions described in the two successive blocks.

FIG. 23 illustrates a movement of the substitute tool 22 with respect to the workpiece 1 when it is assumed that the workpiece 1 is stopped. The substitute tool 22 moves from the first relative position 201 to the second relative position 202, and thus a tool tip end point 22*c* of the substitute tool 22 moves as indicated by an arrow 195. Together with the movement of the substitute tool 22, the line 132*a* which finally generates the machining surface moves. At that time, a plurality of moving points can be set on the line 132*a*. A movement speed of the plurality of moving points is different from each other depending on a position on the line 132*a*.

In the example illustrated in FIG. 23, points on both ends of the line 132*a* which finally generates the machining surface are set as the moving points 183 and 185. The moving point 183 moves as indicated by an arrow 191. The moving point 185 moves as indicated by an arrow 192. The grooving includes a rotational movement, and the moving points 183 and 185 have curved moving paths, however, the arrows 191 and 192 indicate positions before and after the movement by straight lines.

A relative speed of the moving point 183 to the workpiece 1 and a relative speed of the moving point 185 to the workpiece 1 are different from each other. The relative speed of the moving point becomes larger as a distance from a rotation center of the B axis is greater. In the example, the relative speed of the moving point 183 is greater than the relative speed of the moving point 185. Thus, the fastest moving point, at which the relative speed of the tool to the workpiece 1 is the fastest, is the moving point 183 among the plurality of moving points on the line 132*a* which finally generates the machining surface. The fastest moving point can be estimated as described above. Alternatively, a moving point of which moving distance from the first relative position to the second relative position is the longest can be estimated as the fastest moving point.

In the grooving according to the present embodiment, relative speeds on the outward path of the second time and of the third time are the same as a relative speed on the outward path of the first time. With reference to FIG. 21, a relative speed of a moving point 186 is greater than a relative speed of a moving point 187 on the line 132*b* which finally generates the machining surface in the machining on the outward path of the second time. Further, with reference to FIG. 22, a relative speed of a moving point 188 is greater than a relative speed of the moving point 184 on the line 132c which finally generates the machining surface in the machining on the outward path of the third time. The moving points 186 and 188 are the fastest moving points in the respective machining.

As described above, the relative speeds of the moving points on the lines 132a, 132b, and 132c which finally generate the machining surface become larger as distances from the rotation center of the B axis are greater. In other words, the moving point 183 can be estimated that the relative speed to the workpiece 1 is the fastest among the relative speeds of the moving points 183, 186, and 188. Thus, in the machining on the outward path of the second time and of the third time, the feed rate regarding the moving axis of the machine tool can be set using the relative speed of the moving point 183 in the machining on the outward path of the first time on the corresponding positions 85a, 85b, and 85c illustrated in FIG. 6. The feed rate regarding the moving axis of the machine tool may be set based on the relative speeds of the moving points 186 and 188 which are respectively the fastest moving points in the machining of the second time and the third time.

Next, the feed rate regarding the moving axis is set so that a speed of the moving point 183 is the preliminarily specified relative speed or less. In the present embodiment, the feed rate is set so that the relative speed of the moving point 183 coincides with the preliminarily specified relative speed. Further, the feed rate is set based on the length of time in which it takes the substitute tool 22 to move from the first relative position 201 to the second relative position 202. At that time, the feed rate is set by an inverse of the time length in each block. In other words, an inverse time command is described in the output numerical data.

With reference to FIG. 18, the moving point 183 of the substitute tool 22 matches the moving point 183 of the specified tool 81. With reference to FIG. 14, FIG. 18, and FIG. 23, in step 128, coordinate values of the moving point 183 can be calculated when the position of the substitute tool 22 is set. The coordinate values of the moving point 183 at the first relative position 201 and the coordinate values of the moving point 183 at the second relative position 202 are calculated. Next, a distance between the moving point 183 at the first relative position 201 and the moving point 183 at the second relative position 202 is calculated. The distance is calculated by approximating to a linear moving distance as indicated by the arrows 191 and 192.

Next, a calculation method of the feed rate regarding the moving axis of the moving device is described. A speed of a tool on a machining surface input by a user on an input screen, namely a preliminarily specified relative speed of the tool to a workpiece is denoted by F [mm/min]. Machine coordinate values of the substitute tool 22 at the first relative position 201 are denoted by p1, and machine coordinate values of the substitute tool 22 at the second relative position 202 are denoted by p2. The coordinate values include values of the three-dimensional XYZ coordinates and a rotational movement coordinate. In other words, the coordinate values include information of an angle of the tool to the workpiece.

A speed of the fastest moving point when the substitute tool 22 moves from the coordinate value p1 to the coordinate value p2 by taking, for example, a time t [min] is denoted by f(t) [mm/min]. In this case, a distance that the fastest moving point moves during the time t [min] is expressed as f(t)·t.

Thus, an inverse time command value I [1/min] is calculated by the following expression (1).

$$I = F/(f(t) \cdot t) \qquad (1)$$

An arbitrary value can be adopted to the time t as a variable. When 1 [min] is substituted for the time t, the inverse time command value I is deformed to the following expression (2).

$$I = F/f(1) \qquad (2)$$

With reference to FIG. 23, in the present embodiment, the moving distance between the moving point 183 at the first relative position 201 and the moving point 183 at the second relative position 202 is substituted in f(1). By substituting the moving distance of the fastest moving point in f(1), the inverse time command value I when the moving point moves from the first relative position to the second relative position can be calculated.

According to the present embodiment, the first relative position and the second relative position are equivalent to the two successive blocks, so that the inverse time command can be calculated for each block.

As described above, the feed rate regarding the moving axis in a movement from the first relative position to the second relative position can be set based on the information of the tool path and the workpiece.

With reference to FIG. 13 and FIG. 14, the feed rate setting unit 61 calculates the feed rate regarding each moving axis in step 129, and then generates the output numerical data 62 in step 130. The output numerical data 62 can be set by, for example, the coordinates of the XYZ axes and relative angles between the substitute tool 22 and the workpiece 1 on the ABC axes.

Figure 24:
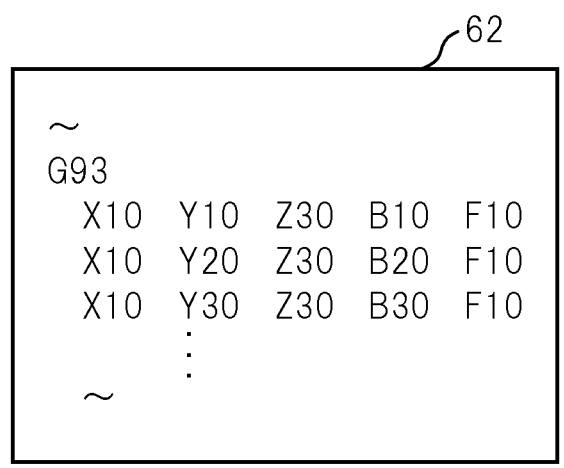
FIG. 24 is a schematic view of output numerical data.

FIG. 24 is an example of the output numerical data 62 generated by the feed rate setting unit 61. Coordinate values in a row correspond to a block. The feed rate regarding the moving axis is specified for each block. The feed rate is specified by the inverse time command. The coordinates of the X axis, the Y axis, and the Z axis indicate a position of the tool tip end point 22c of the substitute tool 22. An angle of the B axis indicates a rotational angle of the workpiece 1.

A mark "G93" of the output numerical data 62 indicates that subsequent speed commands are performed by the inverse time command. The feed rate is determined so that a linear feed movement in the Y-axis direction and a rotational movement around the B axis are performed within a predetermined time period. For example, when the inverse time command is "F10", it means moving to a position of a predetermined Y coordinate and an angle of the B axis by a time of 1/10 [min].

With reference to FIG. 13, the numerical control unit 63 drives the individual axis servomotor 64 based on the output numerical data 62. Accordingly, the relative position between the workpiece 1 and the substitute tool 22 can be adjusted.

As described above, the arithmetic unit of the control device estimates the line which finally generates the machining surface in the machining area of the substitute tool when machining a workpiece. Further, the feed rate setting unit estimates the fastest moving point included in the line which finally generates the machining surface and sets the feed rate regarding the moving axis of the machine tool so that the relative speed of the fastest moving point is the preliminarily specified relative speed or less. By adopting this configuration, a machining speed on an arbitrary point of a machining surface can be set to a desired speed or less. Desired machining accuracy or more can be obtained in the entire machining surface. The machining accuracy can be prevented from being deteriorated on a part of the machining surface because that the relative speed of the tool with respect to the workpiece exceeds the desired relative speed on the part of the machining surface.

According to the present embodiment, the relative speed of the fastest moving point on the line which finally generates the machining surface is controlled to be equal to the preliminarily specified relative speed. However, the present invention is not limited to the above-described embodiment as long as the relative speed of the fastest moving point is set to be the preliminarily specified relative speed or less.

The feed rate setting unit estimates the fastest moving point in the movement from the first relative position to the second relative position and sets the feed rate regarding the moving axis in the movement from the first relative position to the second relative position. By adopting this configuration, the feed rate regarding the individual moving axis can be set for each of the output numerical data blocks.

Further, the feed rate setting unit sets the feed rate regarding the moving axis based on the length of time in which it takes the tool to move from the first relative position to the second relative position with respect to the workpiece. By adopting this configuration, the feed rate can be easily set to the desired speed in a relative movement including a rotational movement. In numerical data for controlling the moving device, a linear movement can be specified on the XYZ coordinates; however, a rotational angle is to be specified in a rotational movement. A unit of linear movement and a unit of rotational movement are different, thus calculation of the feed rate of each moving axis is complicated. In contrast, since the feed rate regarding the individual moving axis is set for each block using the time length, the feed rate can be easily controlled in the case of the relative movement including the rotational movement.

In the above-described embodiment, the tool path of the specified tool 81 is converted into the tool path of the substitute tool 22 to perform grooving. If the specified tool 81 having a tool diameter identical to a groove width can be prepared when forming the groove portion 66, the machining can be performed using the specified tool 81 as illustrated in FIG. 3. In this case, the fastest moving point on the line of the specified tool 81 which finally generates the machining surface is estimated, and the control can be performed so that the relative speed of the fastest moving point is the preliminarily specified relative speed or less.

Figure 25:
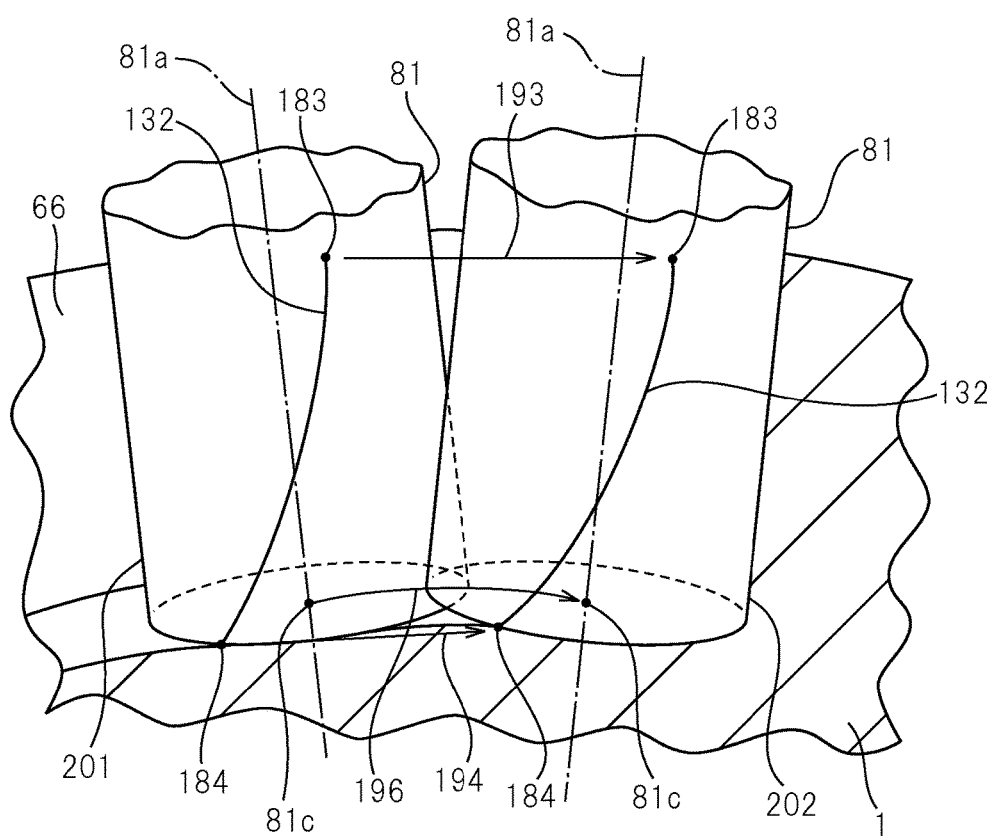
FIG. 25 is a schematic perspective view illustrating the specified tool disposed on a first relative position and a second relative position in a tool path of the specified tool.

FIG. 25 is a schematic perspective view of the specified tool 81 disposed on the first relative position 201 and the second relative position 202. The specified tool 81 moves from the first relative position 201 to the second relative position 202, and thus the tool tip end point 81c moves as indicated by an arrow 196. The line 132 which finally generates the machining surface is estimated at each of the first relative position 201 and the second relative position 202, and the fastest moving point at which the relative speed to the workpiece is the maximum is estimated from among the moving points included in the line 132 of the specified tool 81 which finally generates the machining surface.

In the example illustrated in FIG. 25, the moving point 183 and the moving point 184 are specified as the moving points included in the line 132 which finally generates the machining surface. The moving point 183 and the moving point 184 are points on both ends of the line 132 which finally generates the machining surface. The specified tool 81 moves from the first relative position 201 to the second relative position 202, and thus the moving point 183 moves as indicated by an arrow 193, and the moving point 184 moves as indicated by an arrow 194. The relative speed of the moving point 183 on the upper end of the line 132 which finally generates the machining surface to the workpiece 1 is compared with the relative speed of the moving point 184 on the lower end of the line 132 which finally generates the machining surface to the workpiece 1.

When the relative speed of the moving point 183 is compared with the relative speed of the moving point 184, the relative speed of a point farther from the rotation axis, namely the moving point 183 of which distance from the B axis is larger, is faster. The moving point 183 can be estimated as the fastest moving point. Thus, the feed rate regarding the moving axis is set so that the relative speed of the moving point 183 is the preliminarily specified relative speed or less. For example, a moving distance of the moving point 183 indicated by the arrow 193 is calculated, and the inverse time command can be set for each block based on the calculated moving distance.

Figure 26:
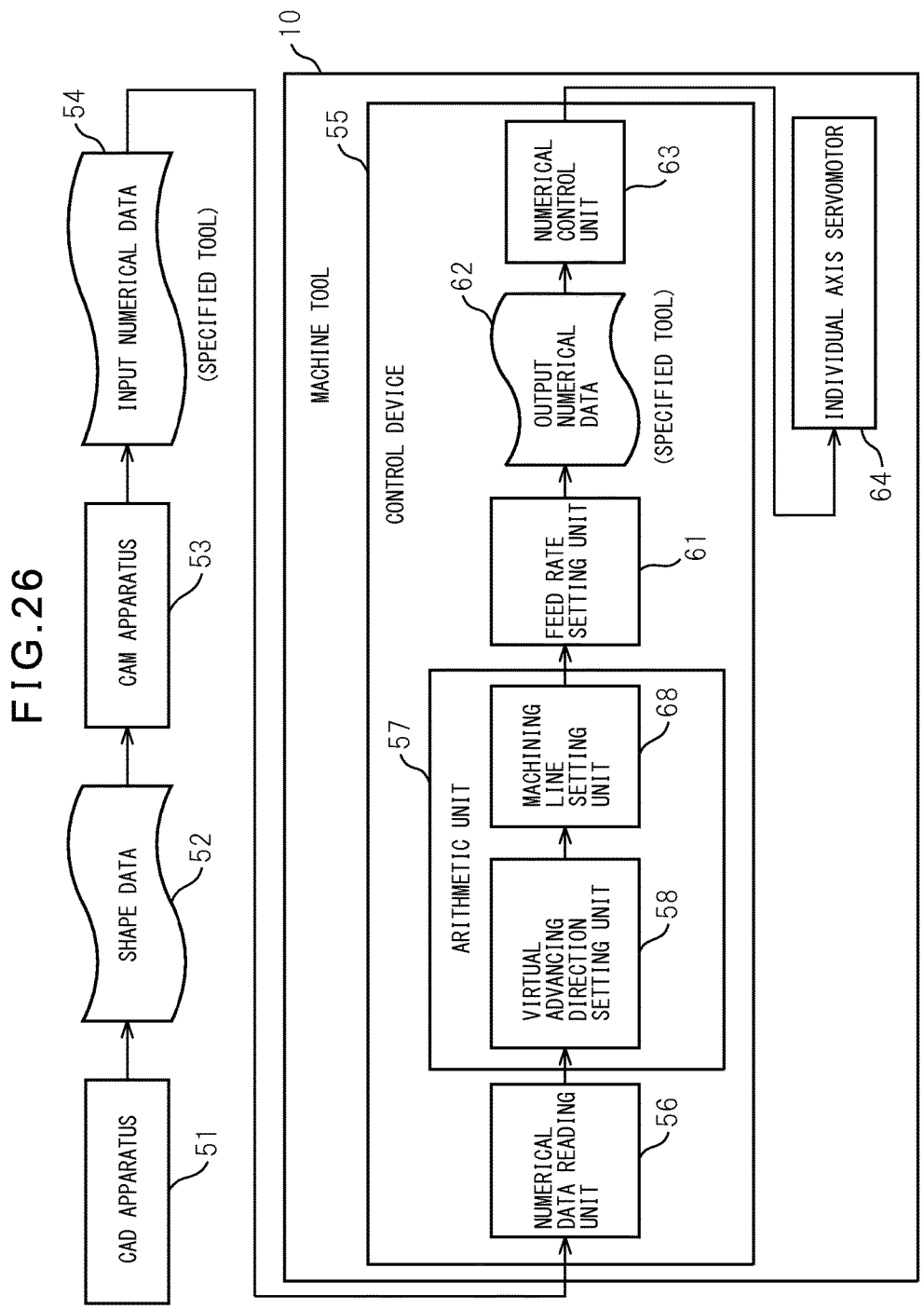
FIG. 26 is a schematic view of a machining system which machines a workpiece using the specified tool.

FIG. 26 is a schematic view of a machining system which machines a workpiece using the specified tool 81. With reference to FIG. 13 and FIG. 26, when the machining is performed using the specified tool 81 having a tool diameter identical to a groove width, the tool path of the specified tool 81 is not necessary to be converted into the tool path of the substitute tool 22. Thus, the arithmetic unit 57 calculates the virtual advancing direction of the specified tool 81 by the virtual advancing direction setting unit 58 and then can estimate the line 132 of the specified tool 81 which finally generates the machining surface by a machining line setting unit 68. The feed rate setting unit 61 can set the feed rate regarding the individual moving axis based on the relative speed of the fastest moving point included in the line 132 which finally generates the machining surface. The output numerical data 62 includes information of the tool path of the specified tool 81 and the relative speed of the specified tool 81 to the workpiece 1.

In the above-described embodiment, both end points of the line which finally generates the machining surface are set as the moving points. However, the present invention is not limited to the embodiment, and an arbitrary point included in the line which finally generates the machining surface can be set as a moving point. However, it is preferable that the moving points on the both ends on the line which finally generates the machining surface are included since one of the moving points on the both ends moves at the maximum speed in many types of machining.

In the above-described embodiment, the movement speed is calculated for each block included in the input numerical data. However, the present invention is not limited to the embodiment, and the feed rate setting unit may calculates a change in the relative speed of the moving point during a period of the movement from the first relative position to the second relative position. During the period when the tool moves from the first relative position to the second relative position, a relative speed of a predetermined moving point may sometimes be changed. For example, when machining is performed in such a manner that the tool moves toward the rotation axis and then moves away from the rotation axis, the relative speed of the tool to the workpiece becomes slower as the moving point approaches the rotation axis. In such case, a change in the movement speed of the moving point when the tool moves from the first relative position to the second relative position can be calculated by functions or the like. A greatest relative speed when the predetermined moving point moves from the first relative position to the second relative position may be calculated using these functions.

The arithmetic unit may add a third position between the first relative position and the second relative position. In this case, the arithmetic unit estimates a line of the tool which finally generates the machining surface on the third position. The feed rate setting unit estimates the fastest moving point in the movement from the first relative position to the third relative position and sets the feed rate regarding the moving axis in the movement from the first relative position to the third relative position. Further, the fastest moving point in the movement from the third relative position to the second relative position is estimated and the feed rate regarding the moving axis in the movement from the third relative position to the second relative position is set.

As described above, the feed rate setting unit can estimate the fastest moving point in the movement between two successive relative positions and set the feed rate regarding the moving axis in the movement between the two successive relative positions. Accordingly, blocks more than the number of the blocks in the input numerical data can be output to the output numerical data. By adopting this configuration, the maximum speed of the moving point on the line which finally generates the machining surface can be more accurately calculated, and the machining accuracy can be improved.

In addition, a plurality of positions may be set between the first relative position and the second relative position. In other words, a plurality of positions, such as the third position and a fourth position, may be added between the first relative position and the second relative position. In this way, an interval between the first relative position and the second relative position can be divided into arbitrary minute sections, so that the machining accuracy can be improved.

The numerical control type machine tool according to the above-described embodiment performs machining using a rotation axis and a plurality of linear feed axes. However, the present invention is not limited to the above-described embodiment and can be applied to a control device of a machine tool which performs machining in a curved line. For example, the present invention can be applied to a machine tool which performs machining associated with the rotational movement and machining moving in a curved line by combining a plurality of linear movements.

Figure 27:
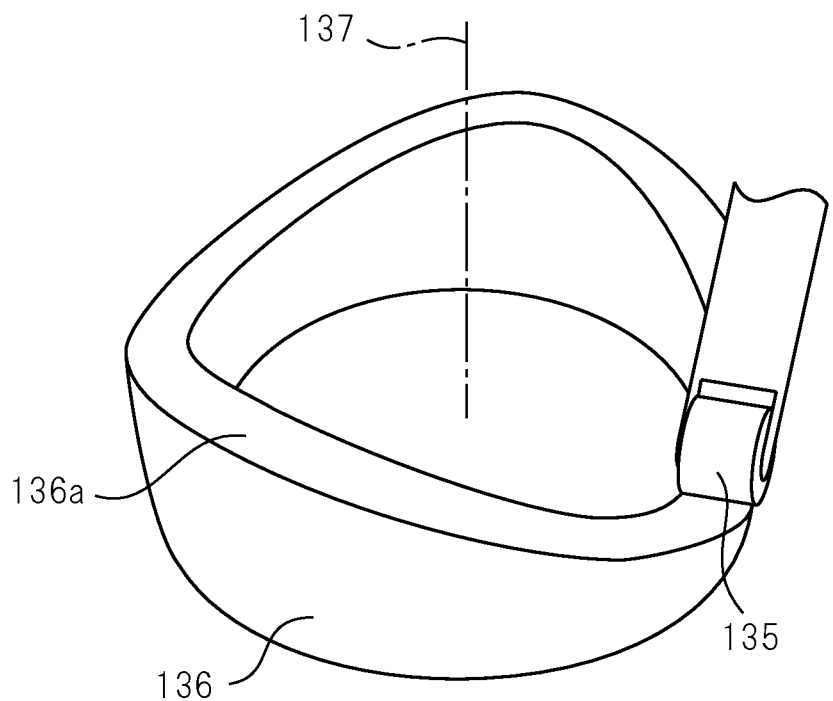
FIG. 27 is a schematic perspective view of an end cam.

FIG. 27 is a schematic perspective view of an end cam. An end cam 136 includes an end face 136a. The end face 136a contacts with a cam follower 135. The cam follower 135 is formed in a columnar shape and rotatably supported. The end cam 136 rotates around a central axis 137, so that positions of the cam follower 135 in a top and bottom direction can be changed.

In machining of the end face 136a of the end cam 136, it is preferable to use a rotary tool having a tool diameter identical to a diameter of the cam follower 135. It is preferable that a rotation axis of the cam follower 135 when rotating and a rotation axis of the rotary tool match each other to perform machining. For example, cutting is performed using an end mill having a diameter identical to the diameter of the cam follower 135 while rotating a workpiece around the central axis 137, and thus the end face 136a can be formed. On the other hand, when a rotary tool having a tool diameter smaller than the diameter of the cam follower 135 is used as a rotary tool to machine the end face 136a, the end face 136a of the end cam 136 can be formed by a machining method similar to that of the above-described machining of a side surface of the groove portion. In this case, the rotary tool having the tool diameter identical to the diameter of the cam follower 135 can be specified as a specified tool. In addition, a rotary tool having a tool diameter smaller than the diameter of the cam follower 135 can be specified as a substitute tool. In the machining of this case, the line which finally generates the machining surface can be estimated, and the feed rate regarding the moving axis of the machine tool can be set based on the fastest moving point included in the line which finally generates the machining surface.

Figure 28:
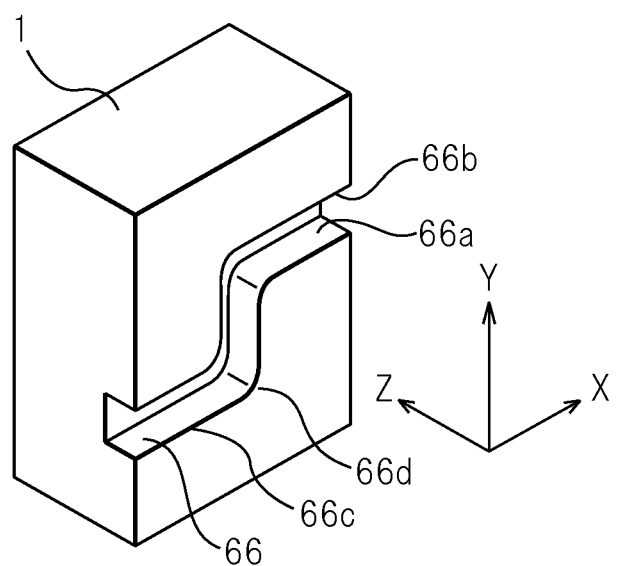
FIG. 28 is a schematic perspective view of a face cam.

FIG. 28 is a schematic perspective view of a face cam. In manufacturing of a face cam, the groove portion 66 is formed on a surface of a plate member. The groove portion 66 of the face cam may sometimes include a linear portion 66c and a curved portion 66d. When machining including such a curved portion 66d is performed, the present invention can be suitably applied. When a rotary tool having a tool diameter identical to the groove width of the groove portion 66 is used, the line which finally generates the machining surface is generated on the machining area in which the side surface 66a on one side is machined, and the line which finally generates the machining surface is also generated on the machining area in which the side surface 66b on the other side is machined. Regarding moving points included in both of the lines which finally generate the machining surfaces, the fastest moving point at which the relative speed of the tool to the workpiece is the maximum is estimated. The feed rate regarding the moving axis of the machine tool can be set so that the relative speed of the fastest moving point is the preliminarily specified relative speed or less.

The tool according to the present embodiment is a rotary tool which rotates. However, the present invention is not limited to the above-described embodiment and can be applied to arbitrary tools.

The above-described embodiments can be appropriately combined with each other. In the above-described drawings, the same reference numerals are attached to the same or corresponding portions. The above-described embodiments are merely examples and are in no way intended to limit the invention. Further, the above-described embodiments include modifications indicated in the scope of claims.

REFERENCE SIGNS LIST 1 workpiece
10 machine tool
22 substitute tool
54 input numerical data
55 control device
57 arithmetic unit
58 virtual advancing direction setting unit
61 feed rate setting unit
62 output numerical data
68 machining line setting unit
131 machining area
132, 132a line which finally generates a machining surface
183 to 188 moving point
201 first relative position
202 second relative position

The invention claimed is:

1. A control device of a machine tool which machines a workpiece while a tool is made to move relative to the workpiece, the control device comprising a microprocessor, a memory, and a storage device,
wherein the control device is configured to include:
an arithmetic unit configured to estimate a portion of the tool which finally generates a machining surface when the tool machines the workpiece based on a tool path for the tool to perform machining and information of the workpiece; and a feed rate setting unit configured to estimate a fastest moving point at which a relative speed of the tool to the workpiece is a maximum among a plurality of moving points included in the portion which finally generates the machining surface and set a feed rate regarding a moving axis of the machine tool so that a relative speed of the fastest moving point is equal to or less than a preliminarily specified relative speed, and wherein a plurality of relative positions of the tool to the workpiece is specified in input numerical data to be input to the arithmetic unit, the plurality of relative positions includes a first relative position and a second relative position immediately after the first relative position, and the feed rate setting unit estimates the fastest moving point in a movement from the first relative position to the second relative position and sets the feed rate regarding the moving axis in the movement from the first relative position to the second relative position.

2. The control device of the machine tool of claim 1, wherein the feed rate setting unit sets the feed rate regarding the moving axis based on a length of time in which it takes the tool to move from the first relative position to the second relative position with respect to the workpiece.

3. The control device of the machine tool of claim 1, wherein the arithmetic unit generates a third relative position between the first relative position and the second relative position, and the feed rate setting unit estimates the fastest moving point in a movement between two successive relative positions and sets the feed rate regarding the moving axis in the movement between the two successive relative positions.

4. A machine tool comprising:

the control device of the machine tool of claim 1; and a moving device configured to make the tool move relative to the workpiece based on the feed rate set by the feed rate setting unit.

* * * * *